s011472603B2

(12) United States Patent
Rashford et al.

(10) Patent No.: US 11,472,603 B2
(45) Date of Patent: Oct. 18, 2022

(54) ENCLOSURE FOR SPACEFLIGHT HARDWARE

(71) Applicant: Genesis Engineering Solutions, Inc., Lanham, MD (US)

(72) Inventors: Robert A. Rashford, Gaithersburg, MD (US); Paul W. Richards, Annapolis, MD (US); Christopher Tolman, Annapolis, MD (US); Dylan E. Bell, College Park, MD (US); Christian T. Pirnot, Hyattsville, MD (US); Hristo Atanasoff, Bethesda, MD (US); Mark F. Klappenberger, Crownsville, MD (US); Michael J. Barciniak, Gambrills, MD (US); Thomas Flatley, Chester, MD (US); Rachel A. Edison, Vienna, VA (US); Bunty N. Bhatia, Greenbelt, MD (US); David A. Harvey, Gaithersburg, MD (US); Chad Y. Sheng, Glenelg, MD (US); Miriam Dixon, Greenbelt, MD (US); Daniel Dassoulas, Middletown, MD (US); John Harro, Bowie, MD (US)

(73) Assignee: GENESIS ENGINEERING SOLUTIONS, INC., Lanham, MD (US)

( * ) Notice: Subject to any disclaimer, the term of this patent is extended or adjusted under 35 U.S.C. 154(b) by 0 days.

(21) Appl. No.: 17/217,615

(22) Filed: Mar. 30, 2021

(65) Prior Publication Data

US 2021/0309414 A1 Oct. 7, 2021

Related U.S. Application Data

(60) Provisional application No. 63/003,531, filed on Apr. 1, 2020.

(51) Int. Cl.
*B65D 81/02* (2006.01)
*B65D 25/10* (2006.01)
(Continued)

(52) U.S. Cl.
CPC .......... *B65D 25/108* (2013.01); *B64G 1/641* (2013.01); *B65D 25/08* (2013.01); *B65D 81/056* (2013.01); *B65D 2313/00* (2013.01)

(58) Field of Classification Search
CPC .... B65D 25/08; B65D 25/108; B65D 81/056; B65D 2313/00; B64G 1/641
(Continued)

(56) References Cited

U.S. PATENT DOCUMENTS 3,706,392 A 12/1972 Sprick et al.
3,966,285 A * 6/1976 Porch .................. B65D 7/24
312/263

(Continued)

OTHER PUBLICATIONS

Caffrey Bob, 2nd Planetary CubeSat Science Symposium Using Rideshare to Launch CubeSats & ESPA S/C, Presentation, Sep. 26, 2017, pp. 1-58, NASA.
Moog Space and Defense Group, ESPA User's Guide, The EELV Secondary Payload Adapter, Nov. 2018, pp. 1-26.
Moog Space and Defense Group, ESPA The Evolved Secondary Payload Adapter, 2020.

*Primary Examiner* — Luan K Bui
(74) *Attorney, Agent, or Firm* — Welsh Flaxman & Gitler LLC

(57) ABSTRACT

An enclosure is disclosed for transporting articles upon a satellite. The enclosure is composed of a plurality of interconnected walls coupled via elongated edge connecting members to define an internal space shaped and dimensioned for receiving an article to be transported upon a satellite. The walls are honeycombed aluminum sheets or solid aluminum panels and the edge connecting members are (Continued)

lightweight high strength members shaped and dimensioned for secure attachment to the walls without the use of mechanical coupling members.

20 Claims, 18 Drawing Sheets

(51) Int. Cl.
    *B65D 25/08*     (2006.01)
    *B64G 1/64*     (2006.01)
    *B65D 81/05*     (2006.01)

(58) Field of Classification Search
    USPC ...... 206/521, 583, 586; 220/4.28, 4.33, 668, 220/683
    See application file for complete search history.

(56) References Cited

U.S. PATENT DOCUMENTS

| | | | |
|---|---|---|---|
| 4,325,488 A | | 4/1982 | Ketner |
| 4,558,797 A | * | 12/1985 | Mitchell ................ B65D 90/08 52/282.4 |
| 5,263,701 A | * | 11/1993 | Kleinhen ................ B65H 1/04 271/145 |
| 5,429,259 A | * | 7/1995 | Robin ..................... B65D 9/34 217/65 |
| 5,655,662 A | * | 8/1997 | Garcia .................... B65D 7/24 206/583 |
| 5,829,205 A | | 11/1998 | Clark et al. |
| 6,832,580 B2 | * | 12/2004 | Marchioro ............. A01K 31/08 D30/114 |
| 6,863,190 B2 | | 3/2005 | Rashford |
| 7,267,229 B2 | * | 9/2007 | Chen ...................... B65D 19/06 206/386 |

\* cited by examiner

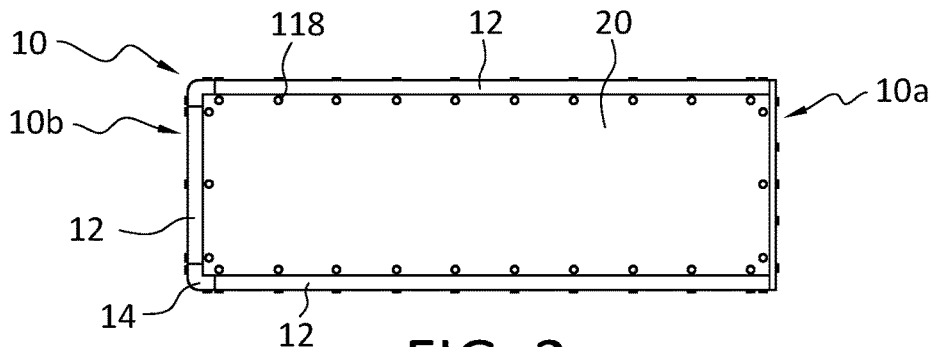
FIG. 2
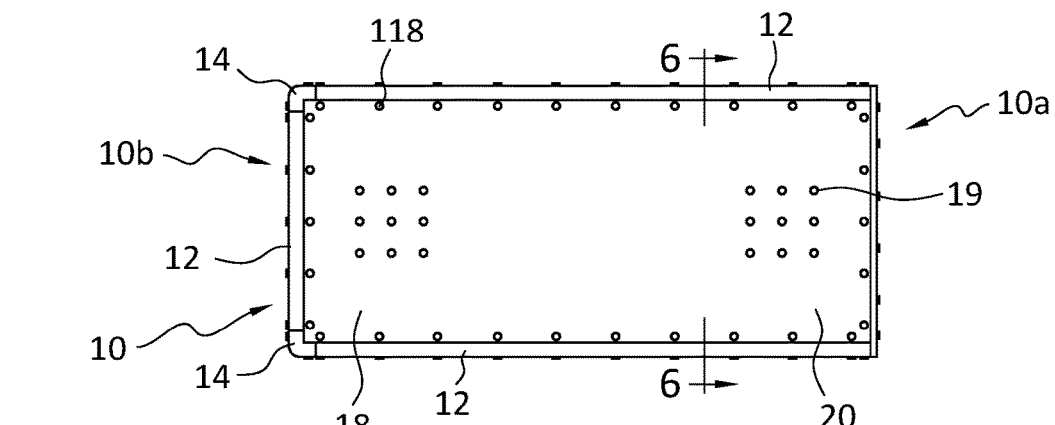
FIG. 3
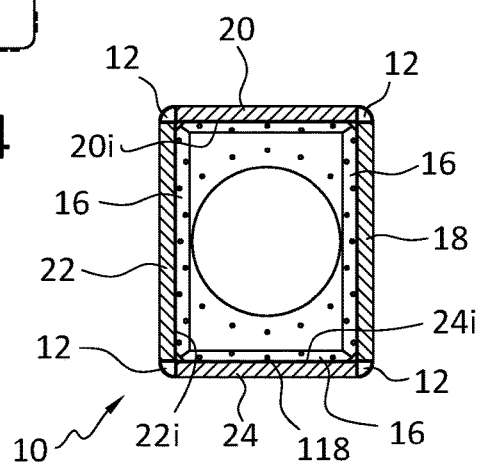
FIG. 4
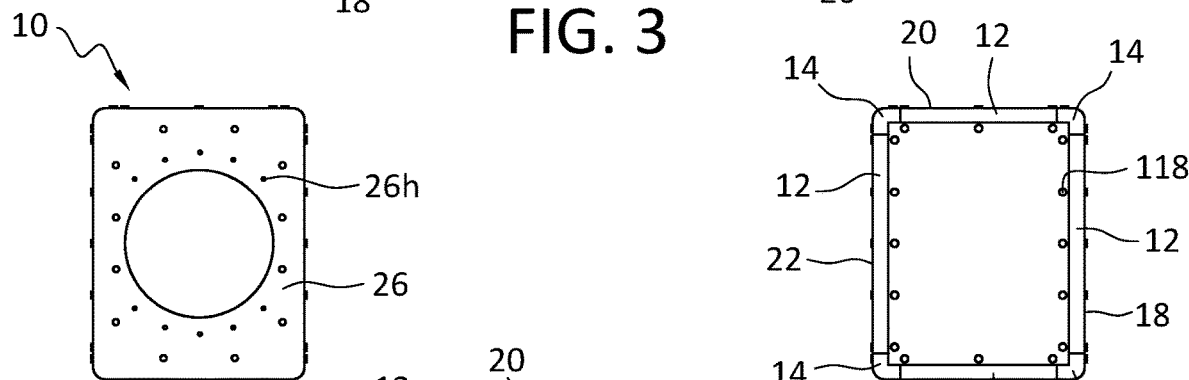
FIG. 5
FIG. 6

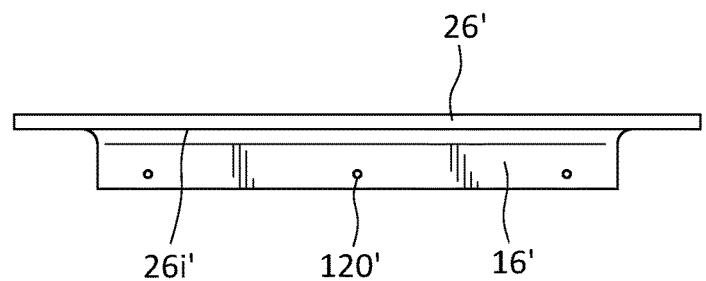
FIG. 34
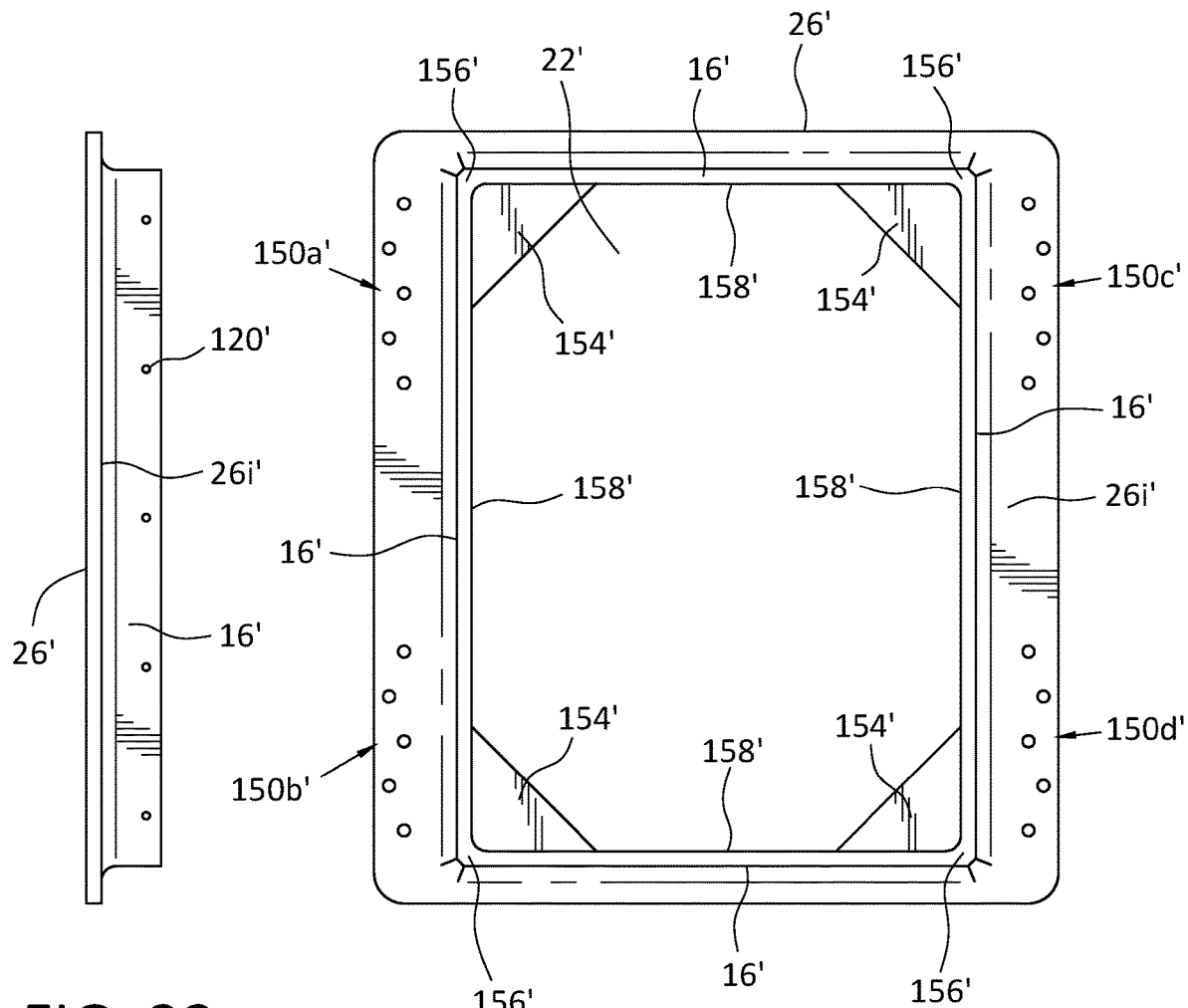
FIG. 33
FIG. 32

ENCLOSURE FOR SPACEFLIGHT HARDWARE

CROSS REFERENCE TO RELATED APPLICATION

This application claims the benefit of U.S. Provisional Patent Application No. 63/003,531, entitled "SPACECRAFT ENCLOSURE," filed Apr. 1, 2020, which is incorporated herein by reference.

BACKGROUND OF THE INVENTION

1. Field of the Invention

The invention relates to an enclosure for transporting space flight articles. More particularly, the invention relates to an enclosure accommodating space flight hardware attached to or part of a spacecraft to form a satellite.

2. Description of the Related Art

Advances in space travel have made frequent space expeditions commonplace. Whether these expeditions are for strategic missions or scientific experimentation, the spacecrafts on which these missions are conducted must carry the payload dictated by the requirements of the mission. This combination of spacecraft with a payload is referred to as a satellite. This invention relates to both spacecraft and payload hardware.

In many instances, the payload is expensive, delicate and required for the mission being undertaken. As such, the payload must be adequately accommodated. However, the space industry places a great priority upon weight and size reduction.

In the case of enclosures for articles, that is, payload, being launched into space, the enclosure must protect the payload structurally and thermally for the life of the mission.

SUMMARY OF THE INVENTION

In one aspect an enclosure for accommodating spaceflight hardware within a satellite is disclosed. The enclosure includes a plurality of interconnected walls, elongated edge connecting members, corner connecting members, and flange members. The elongated edge connecting members, corner connecting members, and flange members connect adjacent interconnected walls to define an internal compartment shaped and dimensioned for receiving an article to be transported upon a satellite.

In some embodiments an internal support structure supports the article as it sits within the enclosure.

In some embodiments the internal support structure includes a center mounting panel.

In some embodiments the center mounting panel includes electronic boxes and instruments.

In some embodiments the internal support structure includes a first slot support assembly positioned adjacent the first end of the enclosure where the first end wall is secured, and a second slot support assembly positioned adjacent the second end of the enclosure where the second end wall is secured.

In some embodiments the first slot support assembly includes first, second, third, and fourth slot flange members secured along the interior surface of the first end wall on opposite sides of the opening.

In some embodiments each of the slot flange members is L-shaped and includes a first end wall engaging planar member and a second slot defining planar member.

In some embodiments the second slot support assembly includes first and second slot flange members extending from a base member.

In some embodiments each of the slot flange members includes a slot defining planar member.

In some embodiments the plurality of interconnected walls includes four sidewalls, a first end wall, and a second end wall.

In some embodiments a 4-point mounting interface assembly is provided for attachment between the enclosure and a spacecraft.

In some embodiments each of the plurality of interconnected walls includes an aluminum outer skin, an aluminum honeycombed core, and an aluminum inner skin.

In some embodiments the aluminum honeycombed core includes various thicknesses, densities, and physical properties.

In some embodiments the skin consists of various thicknesses and physical properties.

In some embodiments each of the plurality of interconnected walls includes aluminum panels of varying thicknesses and surface characteristics to best accommodate the spaceflight hardware.

In some embodiments, when viewed along an end, each of the edge connecting members exhibits a generally V-shaped construction and includes a core section from which first and second flange members extend.

In some embodiments the core section is composed of first and second planar members connected at their respective first ends such that the first and second planar members are oriented perpendicular to each other, and the respective second ends of the first and second planar members are connected by an arcuate member, wherein the first planar member, the second planar member, and the arcuate member define a cavity that extends the entire length of the edge connecting member.

In some embodiments the exposed surfaces of the first and second planar members respectively define first and second end surfaces which function to support the sidewalls, the first end wall, and the second end wall.

In some embodiments the first and second end surfaces are oriented at a 90 degree angle such that they may support walls at a desired perpendicular orientation.

In some embodiments outwardly extending flange members extend perpendicular to the first and second end surfaces to further define the surface structure used to support the sidewalls and the second end wall.

In some embodiments the corner connecting members include a core section from which first, second, and third coupling members extend.

In some embodiments the core section is composed of first, second, and third planar members connected at their respective first ends, with a common central meeting point for the corners of the first, second, and third planar members, such that the first, second and third planar members are oriented perpendicular to each other.

In some embodiments the respective second ends of the first, second, and third planar members are connected by a spheroidal member and the first planar member, the second planar member, the third planar member, and the spheroidal member define a cavity that sits at each of the corners of the enclosure.

In some embodiments the outer surfaces of the first, second, and third planar members. That is, the surfaces of the first, second, and third planar members that face away from the cavity, respectively define first, second, and third core surfaces from which edge coupling structures extend, wherein the edge coupling structures are shaped and dimensioned for male/female coupling with the edge connecting members.

In some embodiments each of the first, second, and third edge coupling structures respectively extends from the first, second, and third core surfaces. The first end of each of the first, second, and third edge coupling structures is coupled to the first, second, and third core surfaces, and the second end of each of the first, second, and third edge coupling structures is a free end having a reduced diameter shaped and dimensioned to fit within the end of an edge connecting member.

In some embodiments the first end wall includes an opening.

In some embodiments the walls include lighter weight structural members.

In some embodiments the flange members are secured along the interior surface of the first end wall and are adapted for engagement with the ends of the edge connecting members and the interior surfaces of the sidewalls.

In some embodiments each flange member is an elongated L-shaped member having first and second planar coupling members oriented perpendicular. The first planar coupling member is shaped and dimensioned for coupling to the interior surface of the first end wall and the second planar coupling member is shaped and dimensioned for coupling to the ends of the edge connecting members and interior surfaces of the respective sidewalls.

In some embodiments the enclosure is attached to a spacecraft via a 15 inch diameter bolt hole pattern.

In some embodiments the enclosure is attached to a spacecraft via a 24 inch diameter bolt hole pattern.

In some embodiments the enclosure is attached to a spacecraft via a 4-point interface coupling member consisting of a 9-hole bolt pattern.

In some embodiments the enclosure is attached to a custom interface.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 2 is a top plan view of the enclosure shown in FIG. 1.

FIG. 3 is a side view of the enclosure shown in FIG. 1.

FIG. 4 is a front view of the enclosure shown in FIG. 1.

FIG. 5 is a rear view of the enclosure shown in FIG. 1.

FIG. 6 is a cross-sectional view along the line 6-6 in FIG. 3.

FIG. 32 is a rear elevation view of the first end wall shown in FIG. 31.

FIG. 33 is a side profile view of the first end wall shown in FIG. 32.

FIG. 34 is a top profile view of the first end wall shown in FIG. 32.

DETAILED DESCRIPTION

Figure 1:
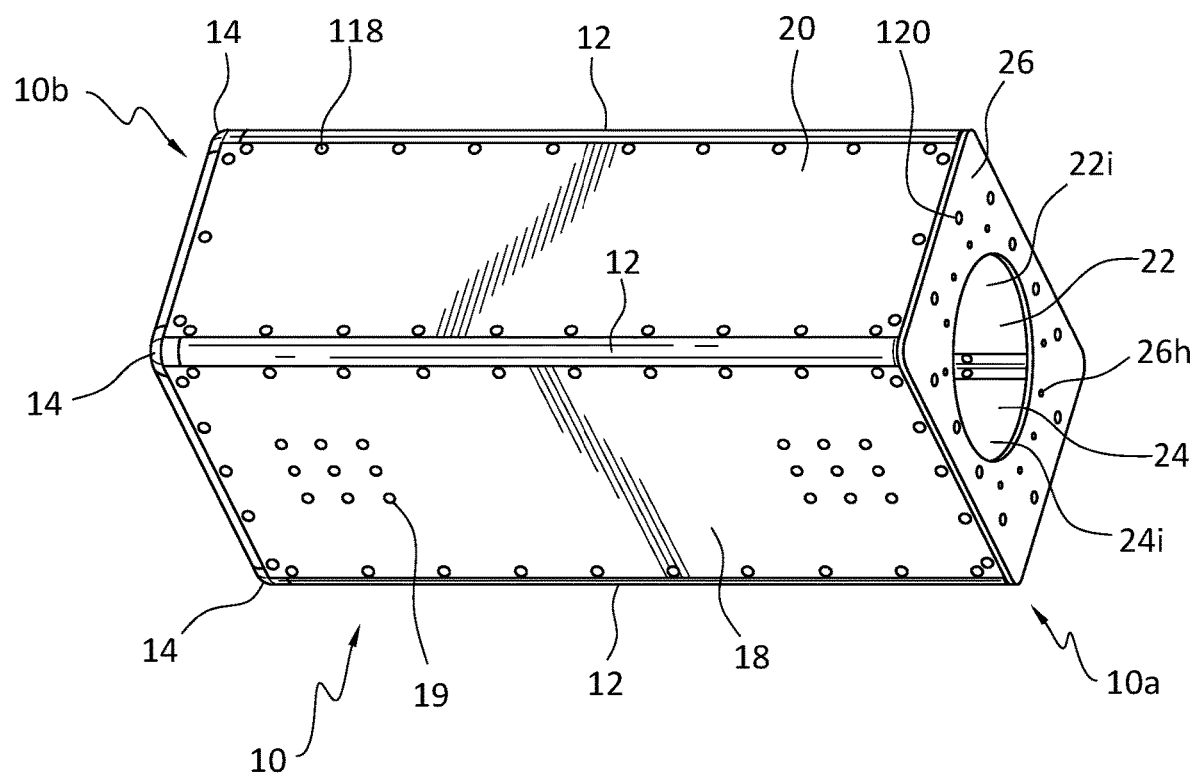
FIG. 1 is a perspective of view the enclosure in accordance with an embodiment of the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 37, an enclosure 10 for launching, accommodating, and transporting payload spaceflight hardware attached to a satellite (or other spacecraft) 200 is disclosed. In the case for enclosures for spacecraft hardware, this enclosure 10 accommodates hardware which could not be accommodated within the original structure of the spacecraft. The enclosure 10 provides for reduced weight, without sacrificing the strength of the enclosure 10. The enclosure provides for low cost production and accelerated schedule production due to the modular design, pre-engineering for structural and thermal modeling, and pre-fabrication or rapid fabrication.

In addition to the priority the space industry places on weight and size is the cost and schedule required to accommodate spaceflight hardware for a successful mission. As will be appreciated based upon the following disclosure, the enclosure 10 addresses the cost and schedule with a reconfigurable modular design. Aspects of the enclosure 10 can be pre-fabricated to reduce cost and schedule. Aspects of the enclosure 10 have been analyzed structurally and thermally to reduce cost and schedule.

With this in mind, the enclosure 10 provides strength, temperature control, and rigidity, while simultaneously minimizing weight. This will ensure that the payload survives launch requirements and space environment. In accordance with a disclosed embodiment, the enclosure 10 of the present invention is adapted for attachment to any variant of an ESPA ring 204. As those skilled in the art appreciate, ESPA rings are manufactured by MOOG Space and Defense Group and function as a modular platform for mission designers to optimize launch stack configurations. ESPA rings are known to be used in various configurations and for various purposes. For example, ESPA rings are known to be coupled to satellites and primary spacecrafts. It is also known that ESPA rings may function as the spacecraft itself. With this in mind, it is appreciated the enclosure 10 may be secured to various spacecrafts structures based upon specific needs and considerations.

With this in mind, the enclosure 10 generally includes a cavity protecting and supporting the articles stored therein. The enclosure 10 is composed of a plurality of interconnected walls coupled via elongated edge connecting members 12, corner connecting members 14, and flange members 16 to define an internal compartment shaped and dimensioned for receiving an article to be transported upon a spacecraft. The enclosure 10 also includes an internal support structure 122 supporting the article as it sits within the enclosure 10.

More specifically, the enclosure 10 includes four sidewalls 18, 20, 22, 24, a first end wall 26 and a second end wall 28. The walls are held together by a series of edge connecting members 12, corner connecting members 14, and flange members 16 shaped and dimensioned for engaging respective edges of the various walls to create a six-sided enclosure 10 in which articles may be stored and supported. In practice, and as will be appreciated based upon the following disclosure, the edge connecting members 12 and the corner connecting members 14 are first assembled to define a frame of the enclosure 10. Thereafter, the first end wall 26 is secured by attaching the flange members 16 to the free ends of respective edge connecting members at the first end of the enclosure 10. A center mounting panel 124 is secured within the enclosure 10, and the remaining walls are secured to the respective edge connecting members.

As will be discussed below in greater detail, the walls, the edge connecting members 12, the corner connecting members 14, and the flange members 16 are respectively shaped and dimensioned for secure attachment through the use of fastening members 118 (for example, screws, bolts etc.) and adhesive (not shown). As such, and as shown in the various figures, the sidewalls 18, 20, 22, 24, 26, 28, the edge connecting members 12, the corner connecting members 14, and the flange members 16 are provided with coupling holes 120 at various predetermined locations for the assembly of the enclosure 10. Through the application of material choices, structural design, and optimal assembly offered in accordance with the present invention weight is reduced without sacrificing the overall strength of the enclosure 10.

As will be appreciated based upon the following disclosure, the four sidewalls 18, 20, 22, 24 and the second end wall 28 are held together by a series of edge connecting members 12 and corner connecting members 14. The first end wall 26 is secured to the sidewalls 18, 20, 22, 24 via the flange members 16 shaped and dimensioned for engaging respective edges of the various walls to create a six-sided enclosure 10 in which articles may be stored and supported. As will be appreciated based upon the following disclosure, first and third sidewalls 18, 22 are identical and second and fourth sidewalls 20, 24 are identical.

With the exception of holes 19 provided in the first and third sidewalls 18, 22 for the attachment of ground support equipment, the distinctive holes in the first end wall 26, the coupling holes 121, and the variations in the length/width of the walls, the construction of the walls is the same. In accordance with an embodiment of the present invention, the wall is a honeycombed aluminum structure. Specifically, the wall includes an aluminum outer skin (or outer face sheet), an aluminum honeycombed core and an aluminum inner skin (or inner face sheet). A disclosed embodiment includes an aluminum honeycombed core thickness of approximately 1.00 inches and a skin thickness of approximately 0.040 inches, resulting in a total wall thickness of 1.080 inches. However, it should be appreciated the aluminum honeycombed core may include various thicknesses, densities, and physical properties. Further, the skin may include various thicknesses and physical properties. It is further contemplated the wall may be of a solid aluminum construction or constructed from other materials that provide for similar structural and functional characteristics.

The use of a honeycombed structure in accordance with the present invention offers a substantial reduction in weight, while maintaining the strength offered by solid aluminum walls. The wall structure is disclosed in detail in Applicant's prior U.S. Pat. No. 6,863,190, entitled "PROTECTIVE ENCLOSURE FOR USE TRANSPORTING ORBITAL REPLACEMENT UNITS WITHIN A SPACE CRAFT," and issued Mar. 8, 2005, which is incorporated herein to the extent necessary to fully understand the structure of the walls.

As mentioned above, and with reference to FIGS. 1 to 9 and 11 to 14, the sidewalls 18, 20, 22, 24, the first end wall 26, and the second end wall 28 are securely held together through the use of edge connecting members 12. The edge connecting members 12 are shaped and dimensioned to engage adjacent walls and hold them perpendicular to each other. The edge connecting members 12 are, therefore, elongated members. It should be appreciated the edge connecting members 12 may be various lengths depending upon the adjacent walls being held together. For example, there are short and long edge connecting members 12 defining the framework at the second end 10b of the enclosure 10 and long edge connecting members 12 of equal length extending between the second end 10b and the first end 10a of the enclosure 10. While the various edge connecting members 12 may vary in length, they maintain the same structure, so the same reference numeral is therefore used to designate them.

Figure 12:
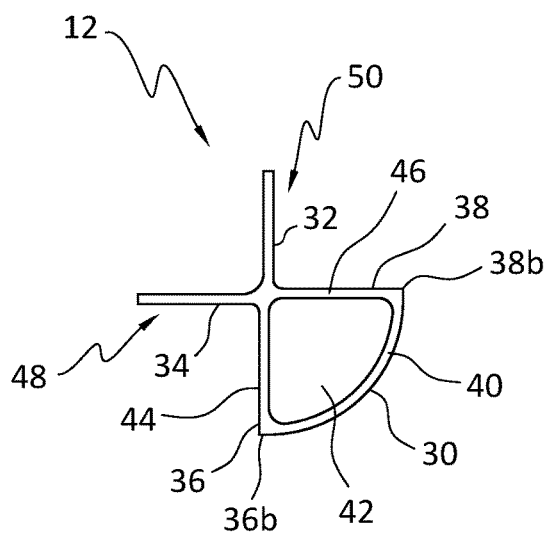
FIGS. 12 and 13 are end views of the edge connecting member from opposite ends thereof.
Figure 13:
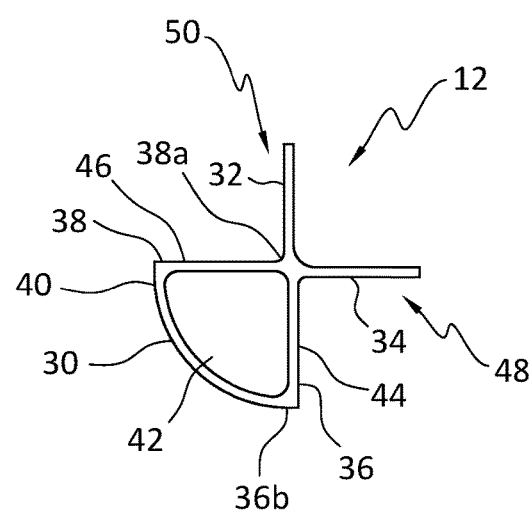
Figure 14:
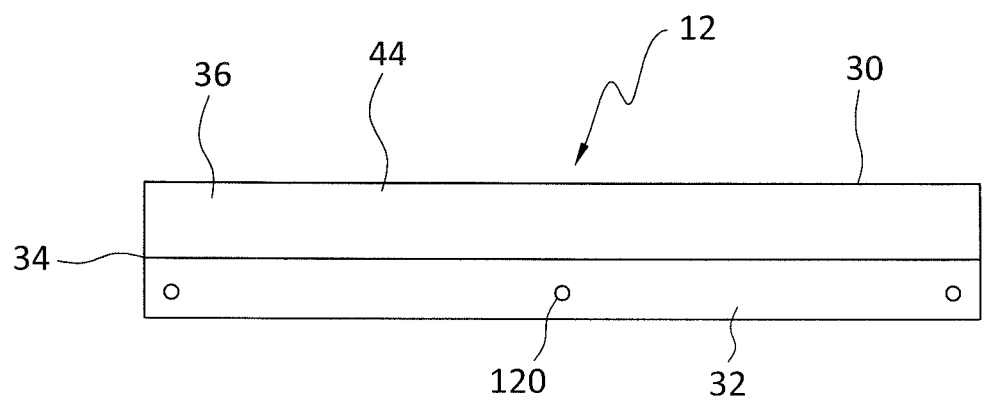
FIG. 14 is a sideview of the edge connecting member.
Figure 15:
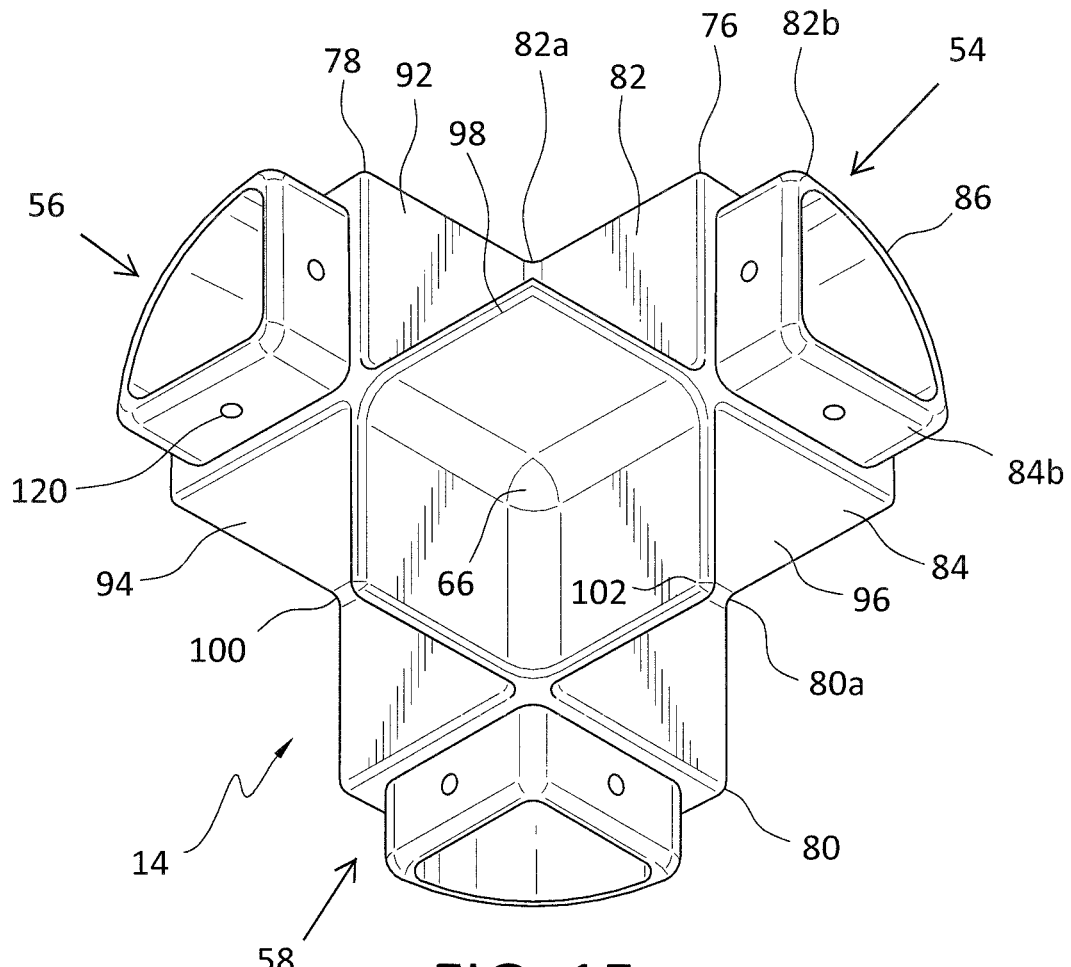
FIG. 15 is a perspective view of the corner connecting member.
Figure 16:
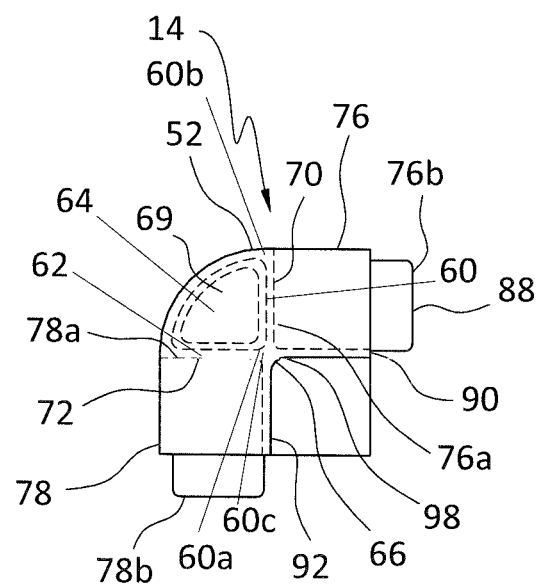
FIGS. 16, 17, and 18 are side views of the corner connecting member from various orientations.
Figure 17:
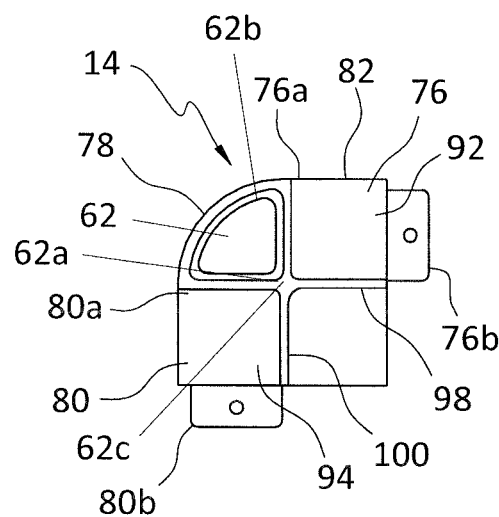
Figure 18:
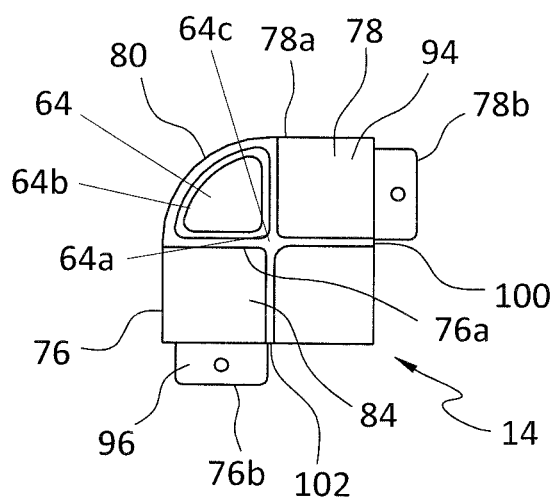
Figure 19:
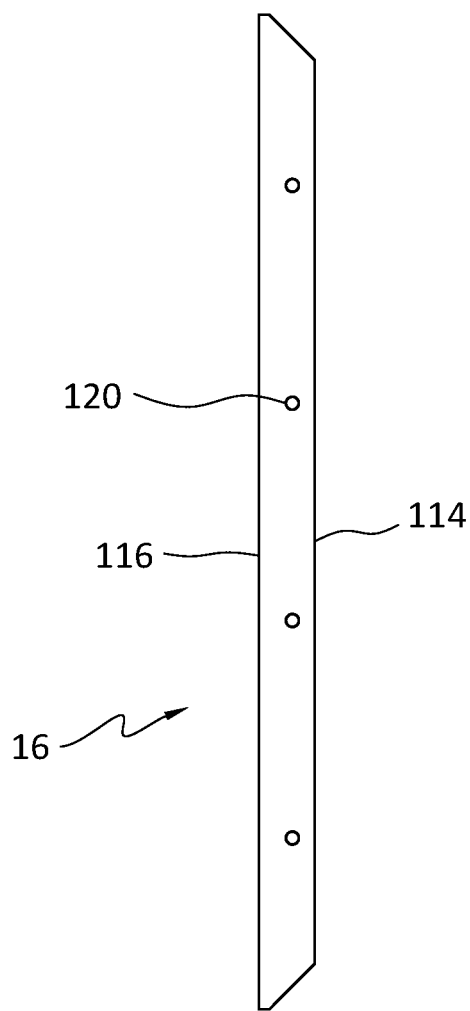
FIGS. 19 and 20 are side views of the flange connecting member rotated 90 degrees relative to each other.
Figure 20:
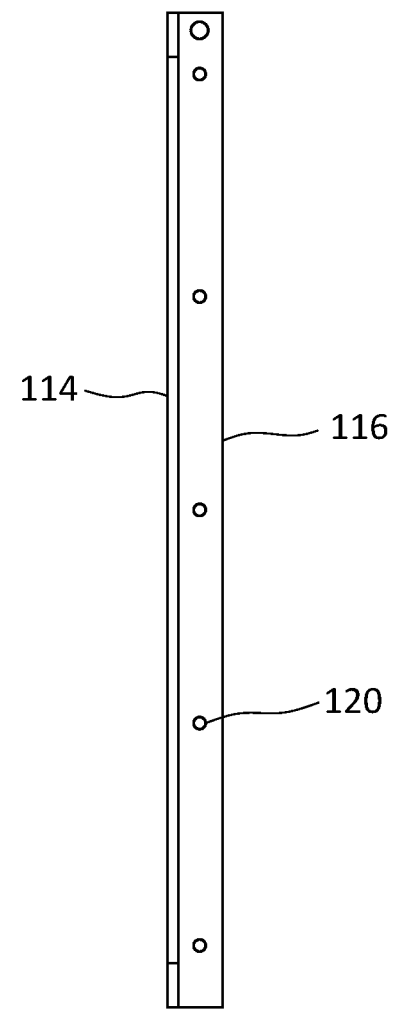
Figure 21:
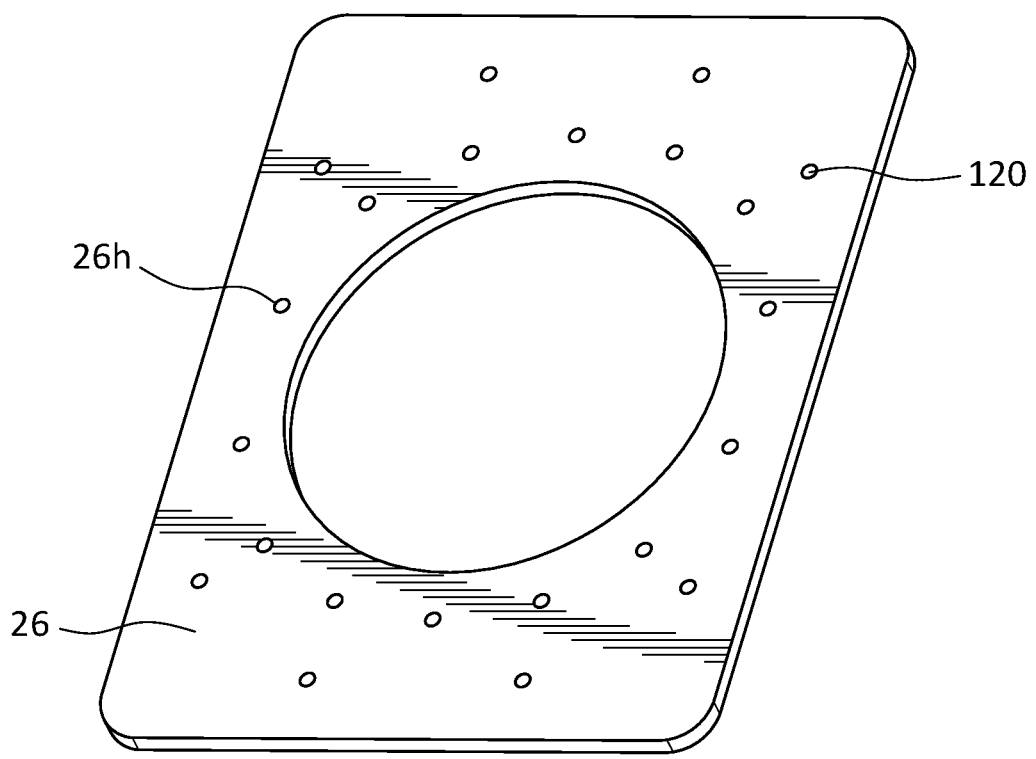
FIG. 21 is a perspective view of one embodiment of the first end wall.
Figures 22, 23:
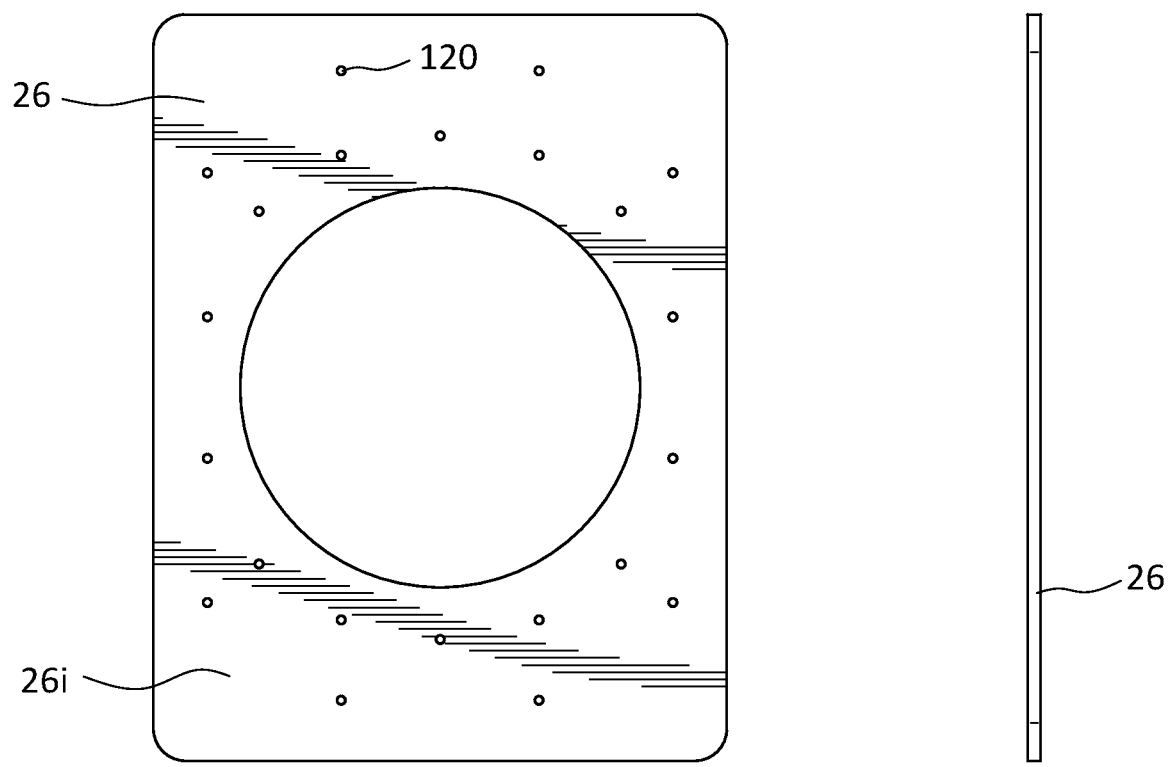
FIG. 22 is a rear view of one embodiment of the first end wall.
FIG. 23 is a side view of one embodiment of the first end wall.
Figure 24:
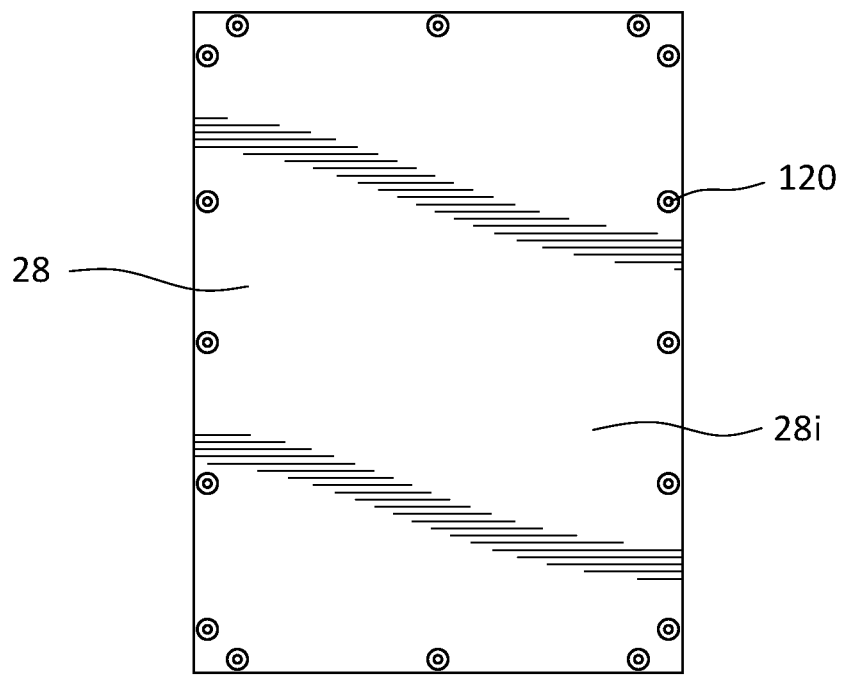
FIG. 24 is a rear view of the second end wall.
Figure 25:
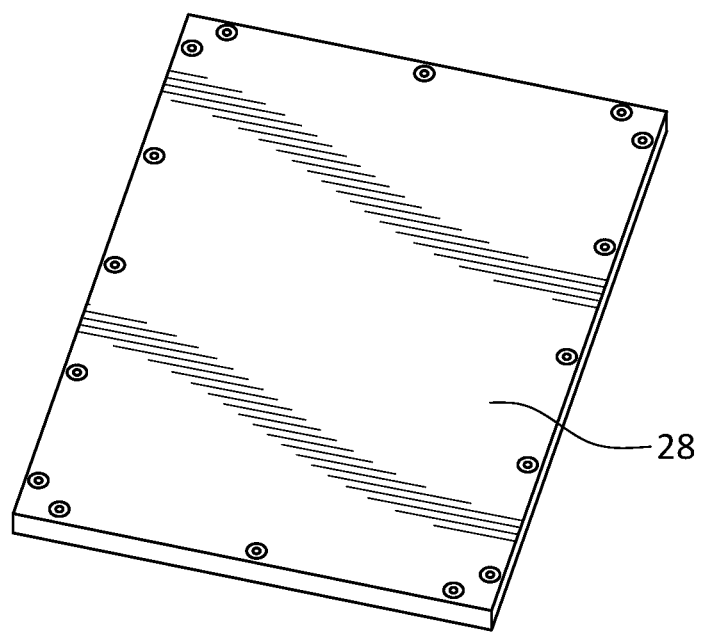
FIG. 25 is a perspective view of the second end wall.
Figure 26:
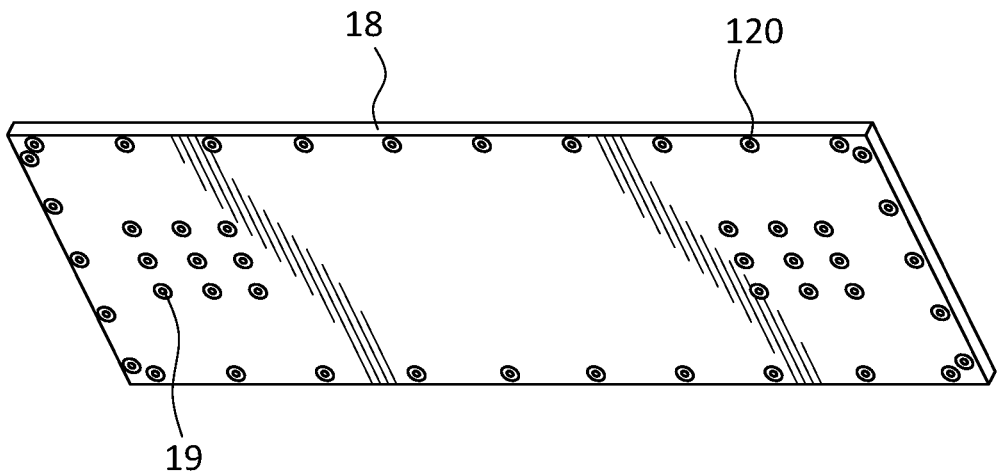
FIG. 26 is a perspective view of the first sidewall, wherein the third sidewall has the same construction.
Figure 27:
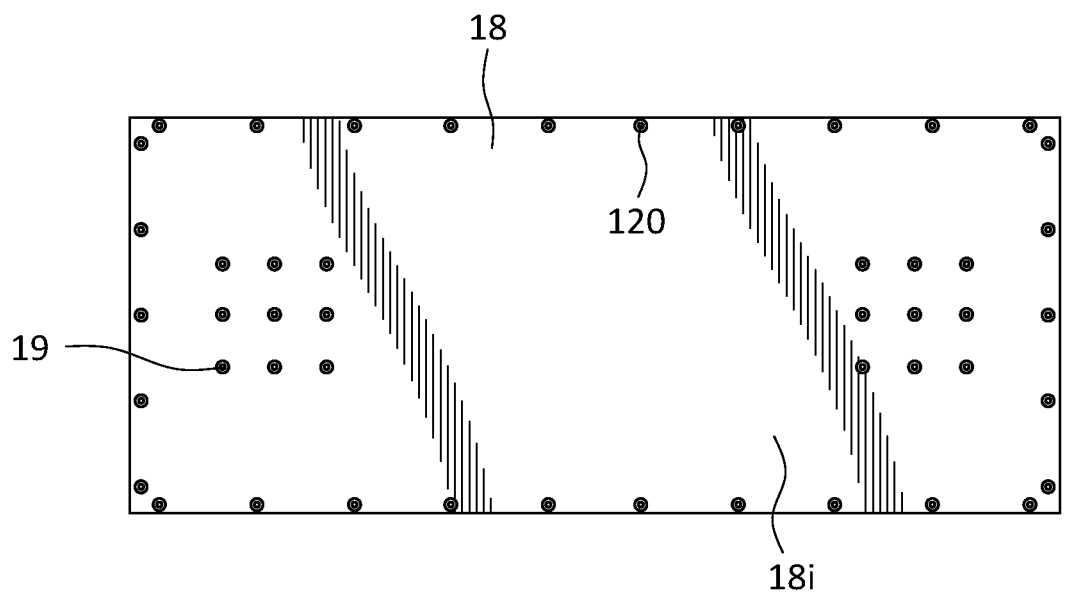
FIG. 27 is a rearview of the first sidewall, wherein the third sidewall has the same construction.
Figure 28:
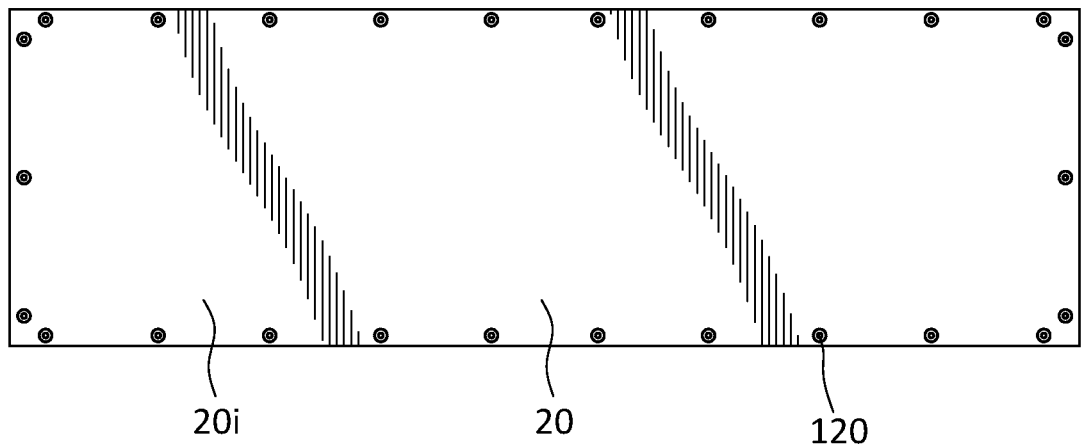
FIG. 28 is a rear view of the second sidewall, wherein the fourth sidewall has the same construction.
Figure 29:
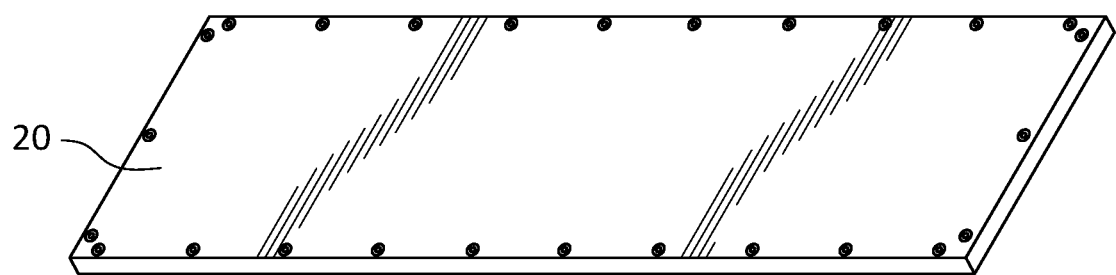
FIG. 29 is a perspective view of the second sidewall, wherein the fourth sidewall has the same construction.

When viewed along an end as shown in FIGS. 12 and 13, each of the edge connecting members 12 exhibits a generally V-shaped construction and includes a core section 30 from which first and second flange members 32, 34 extend. The core section 30 is composed of first and second planar members 36, 38 connected at their respective first ends 36a, 38a such that the first and second planar members 36, 38 are oriented perpendicular to each other. The respective second ends 36b, 38b of the first and second planar members 36, 38 are connected by an arcuate member 40. As such, the first planar member 36, the second planar member 38, and the arcuate member 40 define a cavity 42 that extends the entire length of the edge connecting member 12.

The exposed surfaces of the first and second planar members 36, 38 respectively define first and second end surfaces 44, 46 which function to support the sidewalls 18, 20, 22, 24, the first end wall 26, and the second end wall 28 as discussed below in more detail. The first and second end surfaces 44, 46 are oriented at a 90 degree angle such that they may support walls at a desired perpendicular orientation.

Outwardly extending flange members 32, 34 extend perpendicular to the first and second end surfaces 44, 46 further defining the surface structure used to support the sidewalls 18, 20, 22, 24 and the second end wall 28. Specifically, an outwardly extending first flange member 32 extends perpendicular to the first end surface 44 at a position adjacent the first end 36a of the first planar member 36 where the first and second planar members 36, 38 meet. An outwardly extending second flange member 34 extends perpendicular to the first end surface 44 at a position adjacent the first end 38a of the second planar member 38 where the first and second planar members 36, 38 meet. As a result, the outwardly extending first flange member 32 and the first end surface 44 define an L-shaped surface structure 48 used to support the sidewalls 18, 20, 22, 24 and the second end wall 28. Similarly, the outwardly extending second flange member 34 and the second end surface 46 define an L-shaped surface structure 50 used to support the sidewalls 18, 20, 22, 24 and the second end wall 28.

The L-shaped surface structures 48, 50 of the first and second end surfaces 44, 46 are just large enough for the edge of the sidewalls 18, 20, 22, 24 or the second end wall 28 to fit therein; that is, the L-shaped surface structures 48, 50 of the first and second end surfaces 44, 46 are sized to receive the edge of the sidewalls 18, 20, 22, 24 or the second end wall 28 without permitting substantial "play" in the sidewalls 18, 20, 22, 24 or the second end wall 28 when positioned therein. In accordance with a preferred embodiment of the present invention, the edge connecting members 12 are extruded aluminum. The construction described above once again provides for reduced weight without sacrificing strength.

As mentioned above, secure bonding of the edge of the sidewalls 18, 20, 22, 24 or the second end wall 28 to the respective flange members 32, 34 is ensured by a combination of fastening members 118 (for example screws and bolts) and adhesive. Proper positioning of the fastening members 118 is ensured by the provision of coupling holes 120 preformed in the various elements.

Stability of the enclosure 10 is further enhanced by the provision of corner connecting members 14. Referring to FIGS. 1 to 9 and 15 to 18, the corner connecting members 14 are shaped and dimensioned to engage the ends of respective edge connecting members 12 while also engaging the corners of the adjacent walls. In particular, the corner connecting members 14 engage the ends of respective edge connecting members 12 at the second end of the enclosure 10 to define the framework thereof. The corner connecting members 14 and edge connecting members 12 are coupled via fastening members 118 (for example screws and bolts) and adhesive. The corner connecting members 14 are structured in much the same way as the edge connecting members 12, but extend in the X-plane, Y-plane, and Z-plane while the edge connecting members 12 only extends in two planes.

The corner connecting member 14 includes a core section 52 from which first, second, and third coupling members 54, 56, 58 extend. The core section 52 is composed of first, second, and third planar members 60, 62, 64 connected at their respective first ends 60a, 62a, 64a, with a common central meeting point 66 for the corners 60c, 62c, 64c of the first, second, and third planar members 60, 62, 64, such that the first, second and third planar members 60, 62, 64 are oriented perpendicular to each other and the respective second ends 60b, 62b, 64b of the first, second, and third planar members 60, 62, 64 are connected by a spheroidal member 68. As such, the first planar member 60, the second planar member 62, the third planar member 64, and the spheroidal member 68 define a cavity 67 that sits at each of the corners of the enclosure 10.

The outer surfaces of the first, second, and third planar members 60, 62, 64, that is, the surfaces of the first, second, and third planar members 60, 62, 64 that face away from the cavity, respectively define first, second, and third core surfaces 70, 72, 74 from which edge coupling structures 76, 78, 80 extend. The edge coupling structures 76, 78, 80 are shaped and dimensioned for male/female coupling with the edge connecting members 12.

Each of the first, second, and third edge coupling structures 76, 78, 80 is shaped to resemble the core section 30 of the edge connecting members 12. As such, each of the first, second, and third edge coupling structures 76, 78, 80 respectively extends from the first, second, and third core surfaces 70, 72, 74. As such, the first end 76a, 78a, 80a of each of the first, second, and third edge coupling structures 76, 78, 80 is coupled to the first, second, and third core surfaces 70, 72, 74, and the second end 76b, 78b, 80b of each of the first, second, and third edge coupling structures 76, 78, 80 is a free end having a reduced diameter shaped and dimensioned to fit within the end of an edge connecting member 12.

Only the first edge coupling structure 76 is described below, although it is appreciated the second and third edge coupling structures 76, 78, 80 are identical to the first edge coupling structure 76 described herein. The first edge coupling structure 76 is composed of first and second planar members 82, 84 connected at their respective first ends 82a, 84a such that the first and second planar members 82, 84 are oriented perpendicular to each other. The respective second ends 82b, 84b of the first and second planar members 82, 84 are connected by an arcuate member 86. As such, the first planar member 82, the second planar member 84, and the arcuate member 86 define a cavity that extends the length of the first edge coupling structure 76.

As mentioned above, the first end 76a of the first edge coupling structure 76 is connected to the first core surface 70 and the second end 76b of the first edge coupling structure 76 is shaped and dimensioned to fit within the end of an edge connecting member 12. As such, the second end 76b of the first edge coupling structure 76 includes a reduced diameter section 88 that functions as a male coupling member as it is inserted within the end of an edge connecting member 12. Other than being smaller than the remainder of the first edge coupling structure 76, the reduced diameter section 88 is the same shape as the remainder of the first edge coupling structure 76. In view of the reduction in diameter along the length of the first edge coupling structure 76, an abutment surface 90 is defined at the juncture of the reduced diameter section 88 and the remainder of the first edge coupling structure 76 that functions to limit the insertion of the second end 76b of the first edge coupling structure 76 into the end of the edge connecting member 12.

Given the perpendicular orientation of the first, second, and third edge coupling structures 76, 78, 80, the respective first and second planar members 82, 84 of the first, second, and third edge coupling structures 76, 78, 80 define first, second, and third L-shaped panel edge support surfaces 92, 94, 96 in which the edges of the sidewalls 18, 20, 22, 24 and the second end wall 28 are positioned. The interior surfaces 18i, 20i, 22i, 24i of the sidewalls 18, 20, 22, 24 and the second end wall 28 are supported by first, second, and third interior surface support flanges 98, 100, 102 extending between adjacent first and second planar members 82, 84 adjacent the common central meeting point 66 for the corners of the first, second, and third planar members 60, 62, 64.

The first, second, and third L-shaped panel edge support surfaces 92, 94, 96 and the first, second, and third interior surface support flanges 98, 100, 102 define first, second, and third surface supporting structures 104, 106, 108 that are just large enough for the edge of the sidewalls 18, 20, 22, 24 or the second end wall 28 to fit therein with the interior surfaces 18i, 20i, 22i, 24i and edges of the sidewalls 18, 20, 22, 24 or the second end wall 28 fully supported and the exterior surfaces of the sidewalls 18, 20, 22, 24 or the second end wall 28 fully exposed; that is, the first, second, and third surface supporting structures 104, 106, 108 are sized to receive the edge of the sidewalls 18, 20, 22, 24 or the second end without permitting substantial "play" in the sidewalls 18, 20, 22, 24 or the second end wall 28 when positioned therein. In accordance with a preferred embodiment of the present invention, the corner connecting members 14 are cast aluminum. The construction described above once again provides for reduced weight without sacrificing strength.

Secure bonding of the edge of the sidewalls 18, 20, 22, 24 or the second end to the corner connecting members 14 is ensured by a combination of fastening members 118 and adhesive. Proper positioning of the fastening members 118 is ensured by the provision of coupling holes 120 preformed in the various elements.

Access to the contents of the enclosure 10 is facilitated by the first end wall 26 which includes an opening 110. While the opening 110 provides ready access to the interior of the enclosure, it is appreciated further access may be provided through the removal of any of the sidewalls 18, 20, 22, 24 or the second end wall 28.

As briefly mentioned above, the first end wall 26 is coupled to the sidewalls 18, 20, 22, 24 and the edge connecting members 12 at the first end 10a of the enclosure 10 using a series of flange members 16 (see FIGS. 6, 7, 19 and 20). In accordance with a preferred embodiment of the present invention, the flange members 16 are cast aluminum. The flange members 16 are secured along the interior surface 26i of the first end wall 26 and are adapted for engagement with the ends 12a, 12b of the edge connecting members 12 and the interior surfaces 18i, 20i, 22i, 24i of the sidewalls 18, 20, 22, 24.

Each flange member 16 is an elongated L-shaped member having first and second planar coupling members 114, 116 oriented perpendicular. The first planar coupling member 114 is shaped and dimensioned for coupling to the interior surface 26i of the first end wall 26 and the second planar coupling member 116 is shaped and dimensioned for coupling to the ends of the edge connecting members and interior surfaces of the respective sidewalls 18, 20, 22, 24. In accordance with a disclosed embodiment, four flange members 16 are used and are arranged along the interior surface 26i of the first end wall 26 such that the second planar coupling members 116 are shaped for attachment to the ends 12a of the edge connecting member 12, to fit snuggly within the opening defined for the sidewalls 18, 20, 22, 24, and respectively engage the interior surfaces 18i, 20i, 22i, 24i of the respective sidewalls 18, 20, 22, 24.

As briefly mentioned above, the enclosure 10 also includes an internal support structure 122 supporting the article as it sits within the enclosure 10. In accordance with a disclosed embodiment, the internal support structure 122 is constructed to support a center mounting panel 124 for electronic boxes and instruments 123 offering various functionalites. In particular, the center mounting panel 124 is of a modular, reconfigure avionics design. It allows for multiple spacecraft bus interface configurations, multiple payload/experiment interface configurations, multiple payloads/experiments simultaneously. Additionally, it provides standardized power, command and other telemetry services, and additional onboard processing on a case-by-case basis. In addition to positioning such electronic boxes and instruments 123 on the center mounting panel 124, electronic boxes and instruments 123 may also be secured to sidewalls also. The center mounting panel 124 of the present invention further allows for the integration of various software architectures including the ability to provide for mass storage, data storage, file management, table services, event services, GN&C (guidance, navigation, and control), executive services, time services, software boss, command ingest, telemetry output, communication interfaces, bus support, packet management, store commands, scheduler, limit checker, memory manager, space wire, instrument manager, and CFDP (Coherent File Distribution Protocol) file transfer.

Further still, the present enclosure 10 may be configured rapidly as an adjustable ESPA (EELV (Evolved Expendable Launch Vehicle) Secondary Payload Adapter) Payload mass simulator. In accordance with such an embodiment, mass simulators 127 are mounted within the enclosure 10 in the same manner as the electronic boxes and instruments 123 discussed above.

As those skilled in the art will appreciate, mass simulators are non-functioning representations of spacecraft/satellite components or payloads and are used as substitutes when these components or payloads are not available. Mass simulators are often used during spacecraft or satellite level integration and testing. Mass simulators are designed to have the identical mass and center of gravity (cg) characteristics of the hardware they are substituting. They can be used as substitutes during integration and testing to allow the higher-level assembly (spacecraft or satellite) to continue without the missing component or payload. This substitution is useful for lifting and transportation activities, vibration testing, as well as other system level integration and test activities.

Mass simulator are also known to include electrical connector interfaces and such mass simulators may be used in accordance with the present invention. Where the mass simulator includes electrical connector interfaces, it can be used during the spacecraft/satellite harness routing and hold harnesses in place for testing.

If flight components or payloads miss the launch opportunity, mass simulators can also launch in place of the flight hardware. Flying a mass simulator eliminates the need to redo many types of analysis such as pointing, navigation, and attitude control. Additionally, the launch vehicle coupled-loads analysis (CLA) depends upon each spacecraft being launched to be delivered within the mass and center of gravity limits used for the analysis. If several spacecraft are being launched on the same launch vehicle, a change in mass or center of gravity of one satellite requires all parties and the launch provider to redo the CLA which is expensive.

Figure 7:
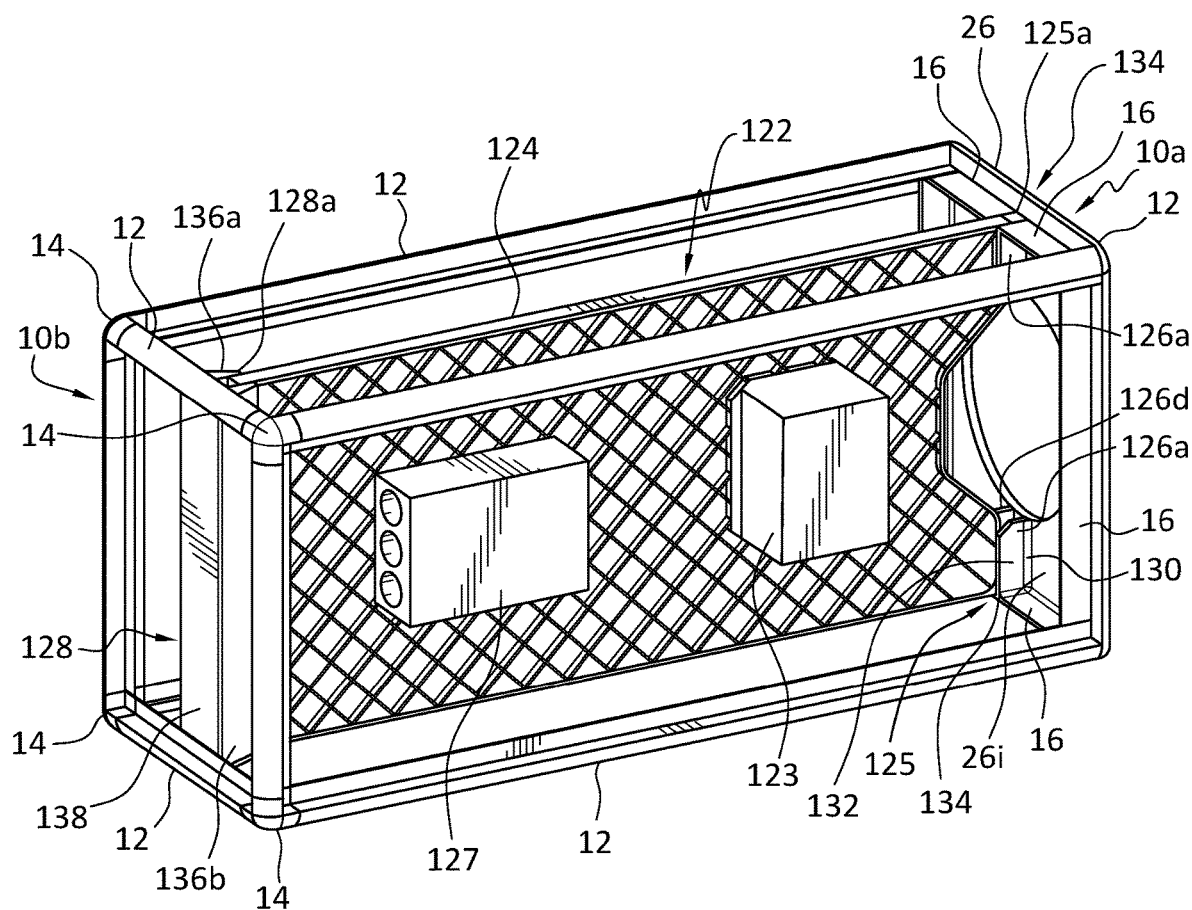
FIG. 7 is a perspective view of the enclosure with the sidewalls removed and with a mass simulator and an electronic box or instrument secured on the internal support structure.
Figure 8:
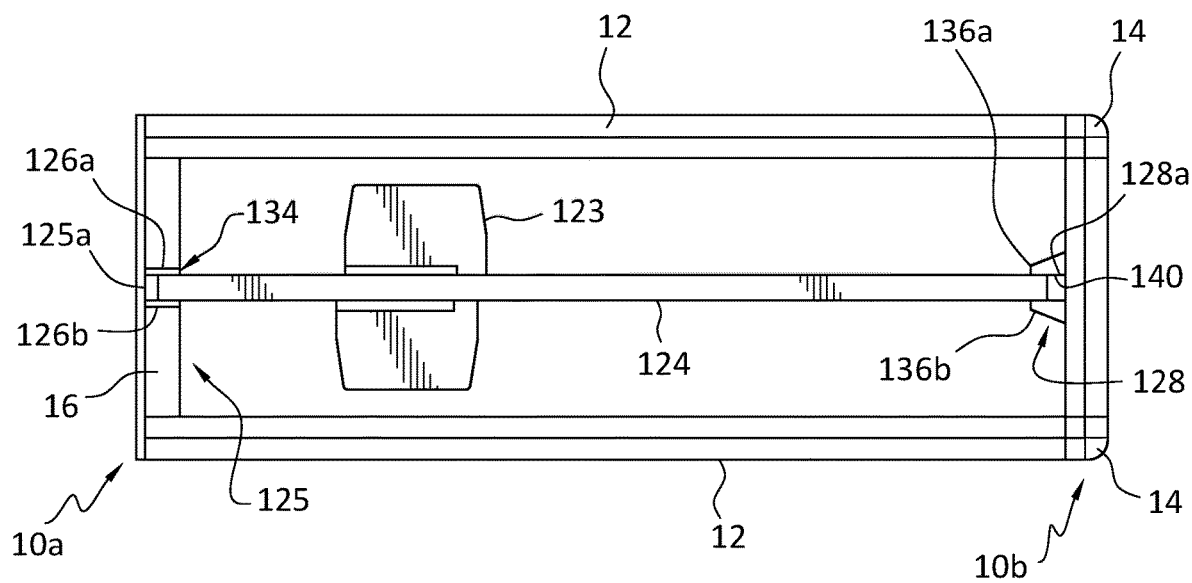
FIG. 8 is a top plan view of the enclosure with the sidewalls removed and with electronic boxes or instruments secured on opposite sides of the internal support structure.
Figure 9:
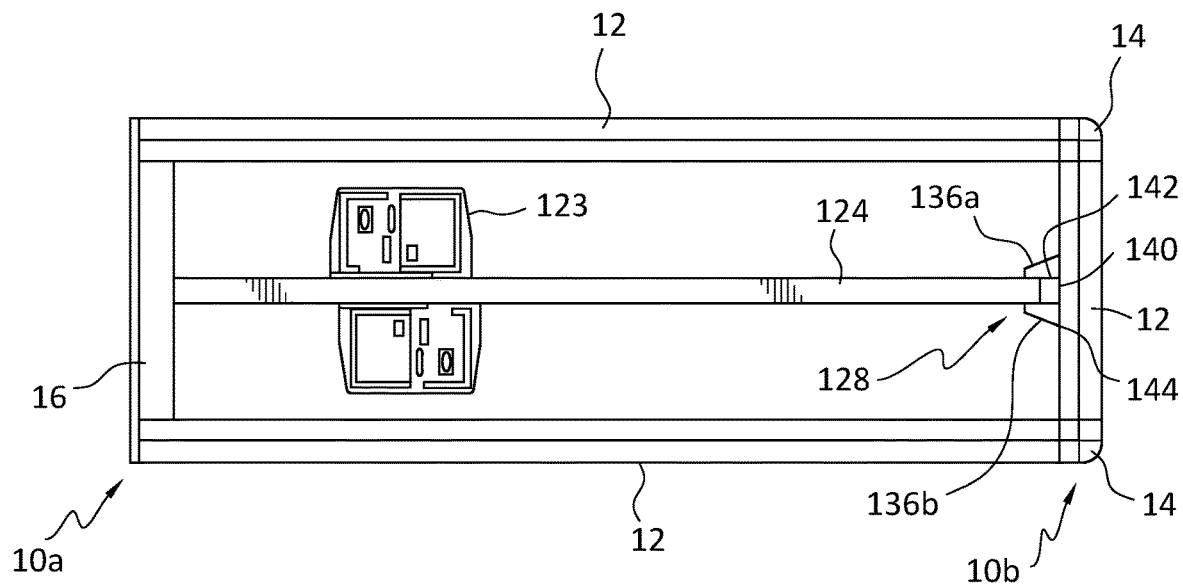
FIG. 9 is a bottom view of the enclosure shown in FIG. 8 with the sidewalls removed.
Figure 10A:
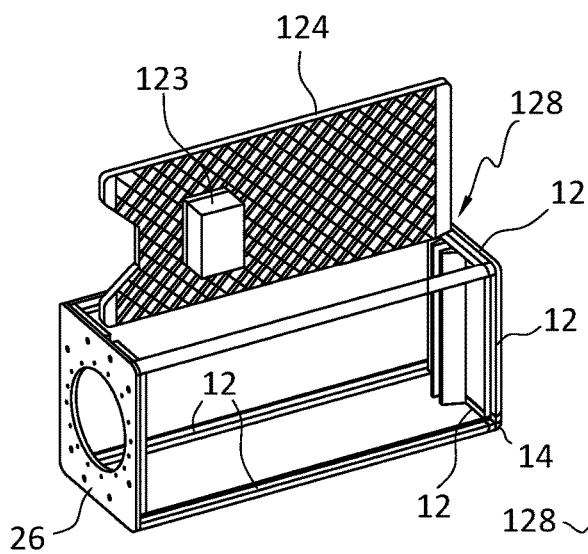
FIGS. 10A-10D show various perspective views regarding the assembly of the enclosure.
Figure 10B:
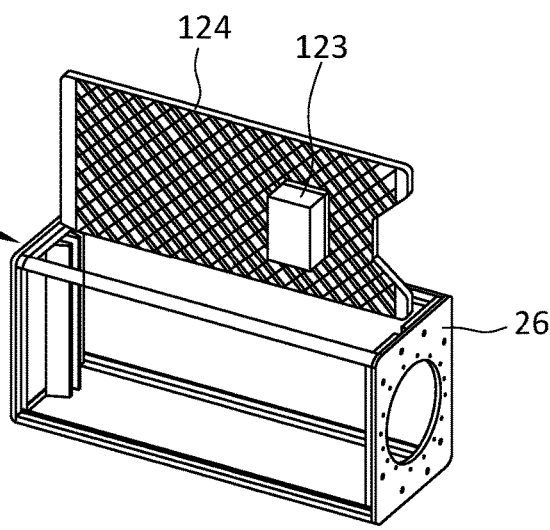
Figure 10C:
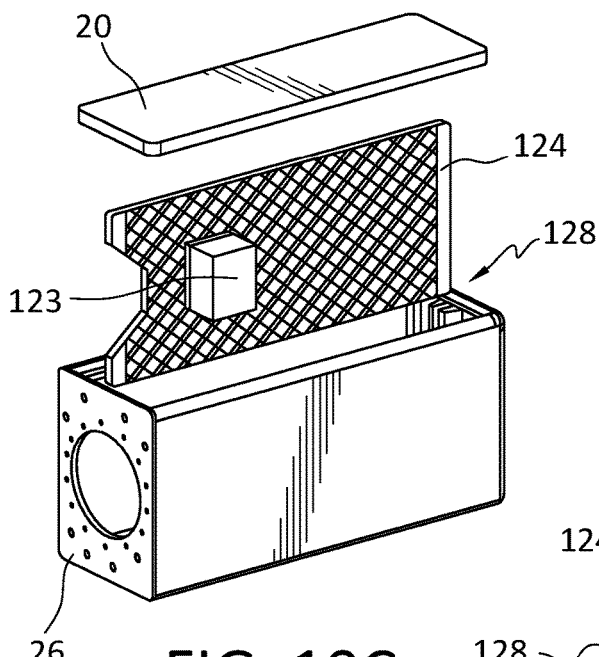
Figure 10D:
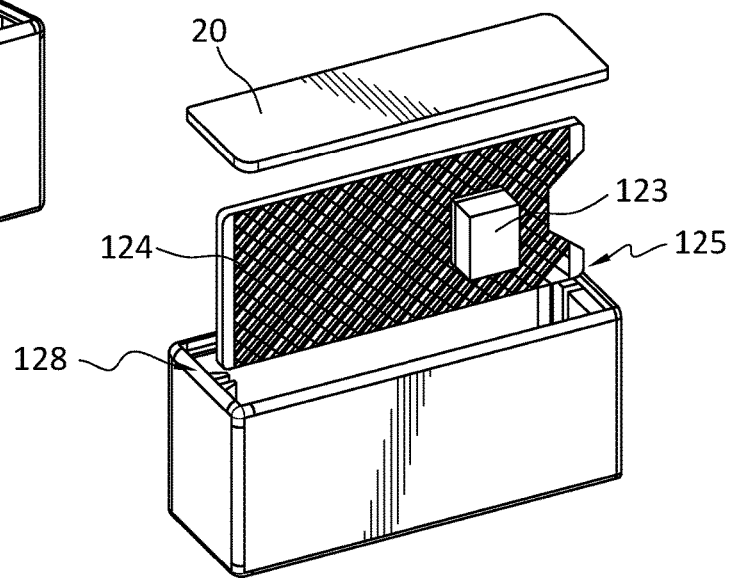
Figure 11:
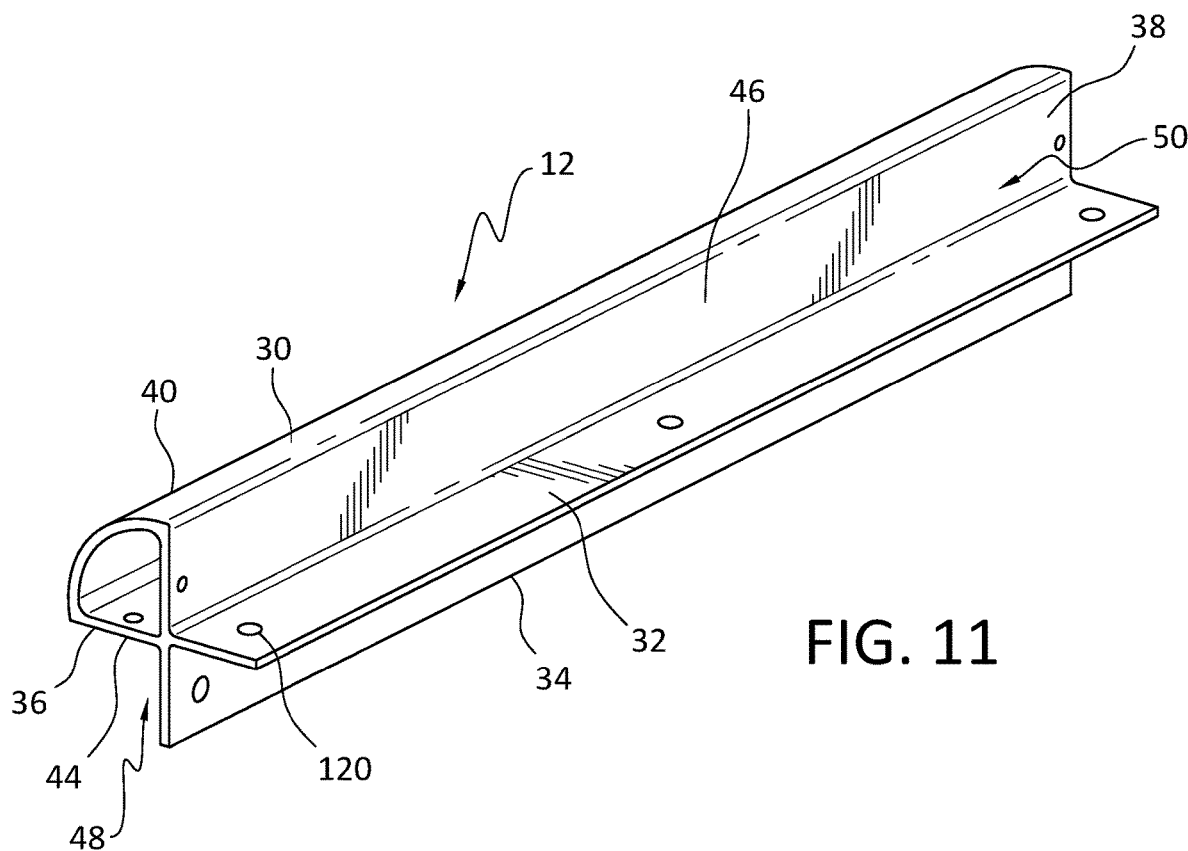
FIG. 11 is a perspective view of an edge connecting member.

With this in mind, it is appreciated the present enclosure 10 can be configured rapidly to incorporate a mass simulator 127 and thereby function as an adjustable ESPA Payload mass simulator (see FIG. 7). Given the low weight of the enclosure and modular contraction, mass can be added and the center of gravity adjusted to match any specific ESPA payload. The mass simulator 127 in accordance with the present invention can be used for various spacecraft/satellite I&T (integration and testing) functions as well as a mass simulator suitable to launch. Further still, and with additional features, the adjustable mass simulator 127 of the present enclosure 10 can become an electrical simulator and/or a thermal simulator.

The internal support structure 122 includes a first slot support assembly 125 positioned adjacent the first end 10a of the enclosure 10 where the first end wall 26 is secured and a second slot support assembly 128 positioned adjacent the second end 10b of the enclosure where the second end wall 28 is secured. The first slot support assembly 125 includes first, second, third, and fourth slot flange members 126a-d secured along the interior surface 26i of the first end wall 26 on opposite sides of the opening 110. Each of the slot flange members 126a-d is L-shaped and includes a first end wall engaging planar member 130 and a second slot defining planar member 132. In particular, the first and second slot flange members 126a, 126b are oriented in a facing relationship such that the second slot defining planar members 132 of the first and second slot flange members 126a, 126b face each other and are spaced a distance to allow the center mounting panel 124 to be positioned therebetween. Similarly, the third and fourth slot flange members 126c, 126d are oriented in a facing relationship on the side of the opening 110 opposite the first and second slot flange members 126a, 126b such that the second slot defining planar members 132 of the third and fourth slot flange members 126c, 126d face each other and are spaced a distance to allow the center mounting panel 124 to be positioned therebetween. In this way, the second slot defining planar members 132 of the first, second, third, and fourth slot flange members 128a-d define a slot 134 in which one end of the center mounting panel 124 may be selectively positioned. One of the flange members 16 secured to the interior surface 26i of the first end wall 26 as described above is positioned adjacent the bottom end 134b of the slot 134 defined by the second slot defining planar members 132 of the first, second, third, and fourth slot flange members 126a-d and provides a stop member as the center mounting panel 124 is positioned within the enclosure 10.

The second slot support assembly 128 includes first and second slot flange members 136a, 136b extending from a base member 138. The second slot support assembly 128, in particular the base member 138 thereof, is secured to the edge connecting members 12 adjacent the second end wall 28. Each of the slot flange members 136a, 136b includes a slot defining planar member 140. In particular, the first and second slot flange members 136a, 136b are oriented in a facing relationship such that the slot defining planar members 140 face each other and are spaced a distance to allow the center mounting panel 124 to be positioned therebetween. In this way, the slot defining planar members 140 define a slot 142 in which the other end of the center mounting panel 124 may be to be selectively positioned. Adjacent the bottom end 128b of the second slot support assembly 128 a stop member 144 is positioned between the slot flanges members 136a, 136b to control insertion of the center mounting panel 124, while the slot 142 defined by the second support assembly 128 remains open at the open end 128a of the second slot support assembly 128 to allow for insertion of the center mounting panel 124 as the center mounting panel 124 is positioned within the enclosure 10.

In practice, the center mounting panel 124 is secured in position before the second sidewall 20 that ultimately covers the open ends 125a, 128a of the first and second slot support assemblies 125, 128. Once all the sidewalls 18, 20, 22, 24 are secured the center mounting panel 124 is accessed via the opening 110 formed in the first end wall 26.

Maneuvering and use of the present enclosure 10 may be facilitated by securing handles at various locations along the walls of the enclosure 10. For example, handles may be secured to any of the walls as the use of the enclosure 10 dictates. In addition, the first and third sidewalls 18, 22 are provided with a series of holes 19 positioned for permitting attachment of ground support equipment to the enclosure 10. As such, it is appreciated the pattern of the holes 19 may be altered to accommodate a variety of ground support equipment. As those skilled in the art will certainly appreciate, the position and use of handles and support structures may be readily varied without departing from the spirit of the present invention.

The enclosure 10 described above provides spacecraft designers and operators with a convenient, lightweight, and high strength enclosure 10 for shipping articles upon a spacecraft by attaching the enclosure 10 to any ESPA variant interface of the ESPA ring 204. Specifically, the present enclosure 10 has achieved a substantial weight reduction when compared to prior spacecraft shipping enclosures, without sacrificing the strength required for protecting expensive, delicate articles required for space operations.

Figure 30:
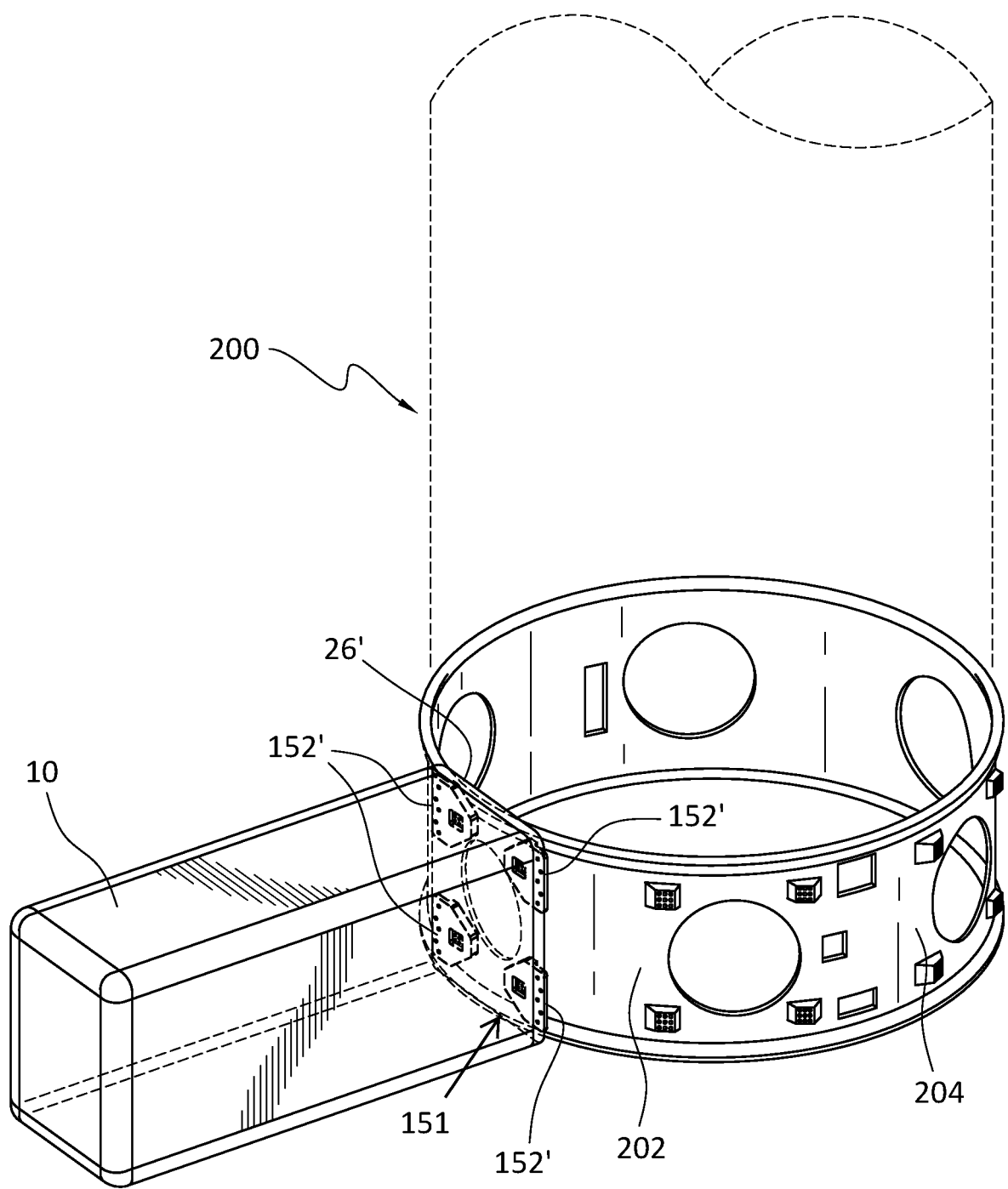
FIG. 30 is a perspective view showing the enclosure secured to an Evolved Expendable Launch Vehicle (EELV) Secondary Payload Adapter known as the ESPA ring, with the remainder of the spacecraft (or satellite) thereof shown schematically with broken lines.
Figure 31:
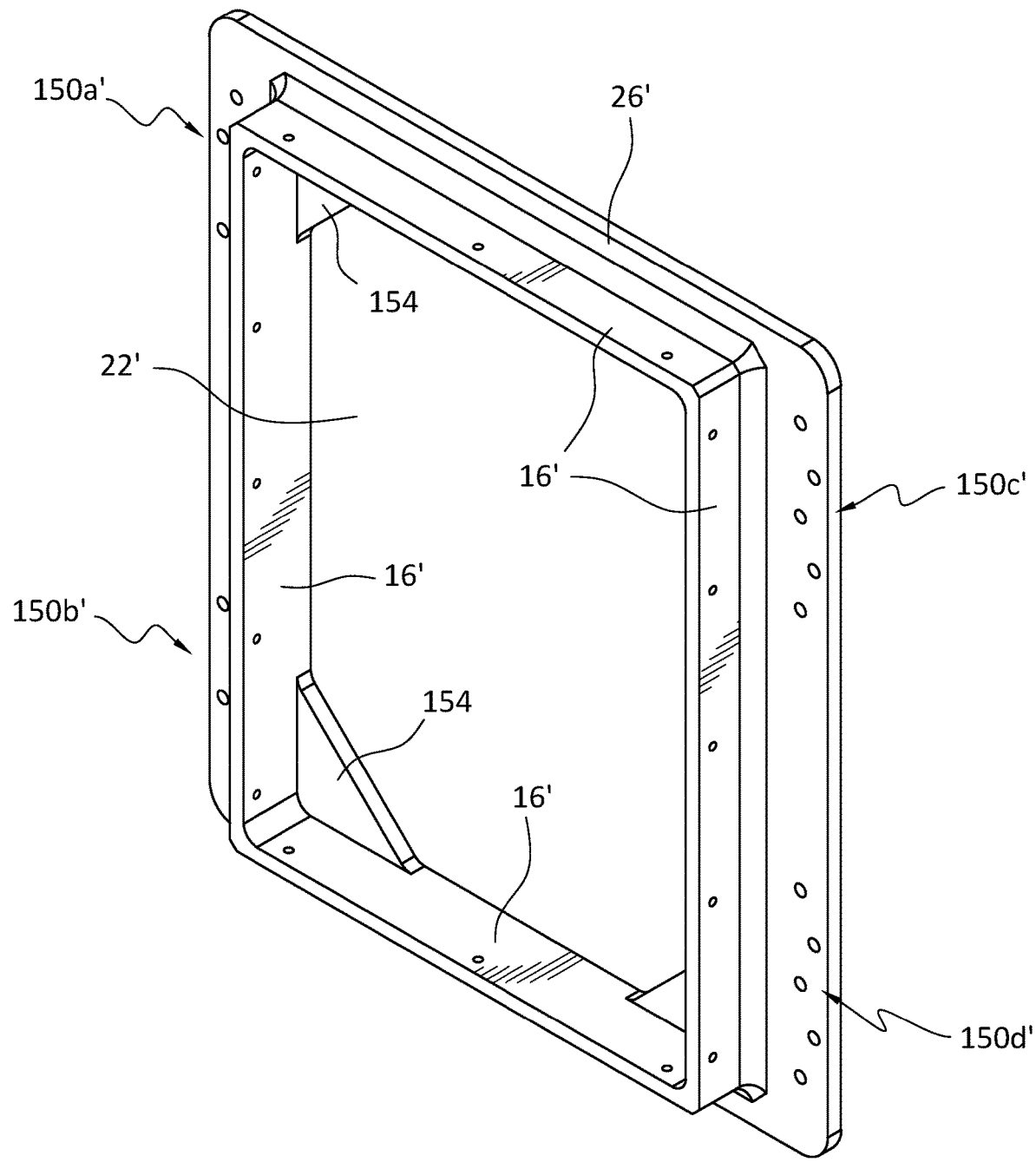
FIG. 31 is a rear perspective view of a first end wall in accordance with an alternate embodiment.
Figure 35:
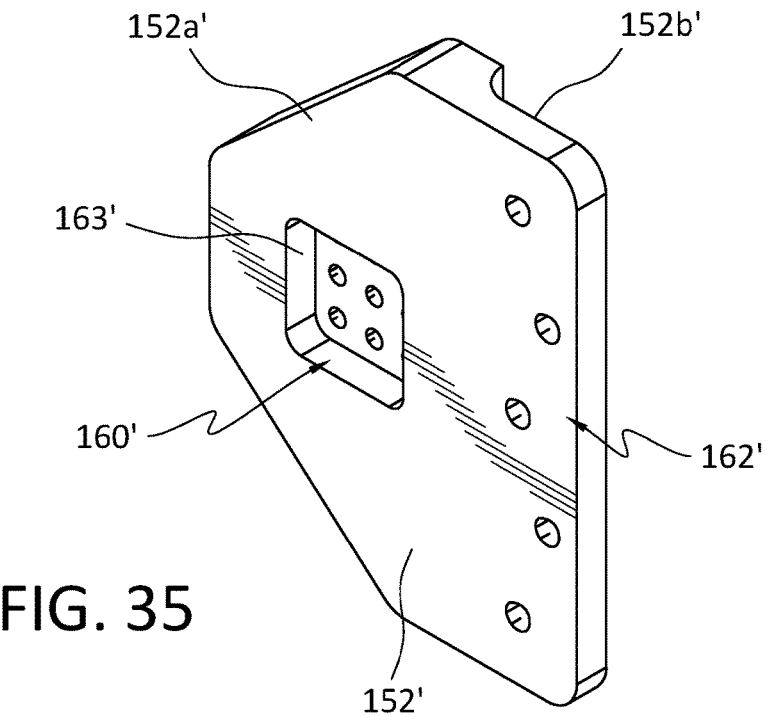
FIG. 35 is a perspective view of an interface attachment coupling member for use in conjunction with a 4-point mount configuration in accordance with an alternate embodiment.
Figures 36, 37:
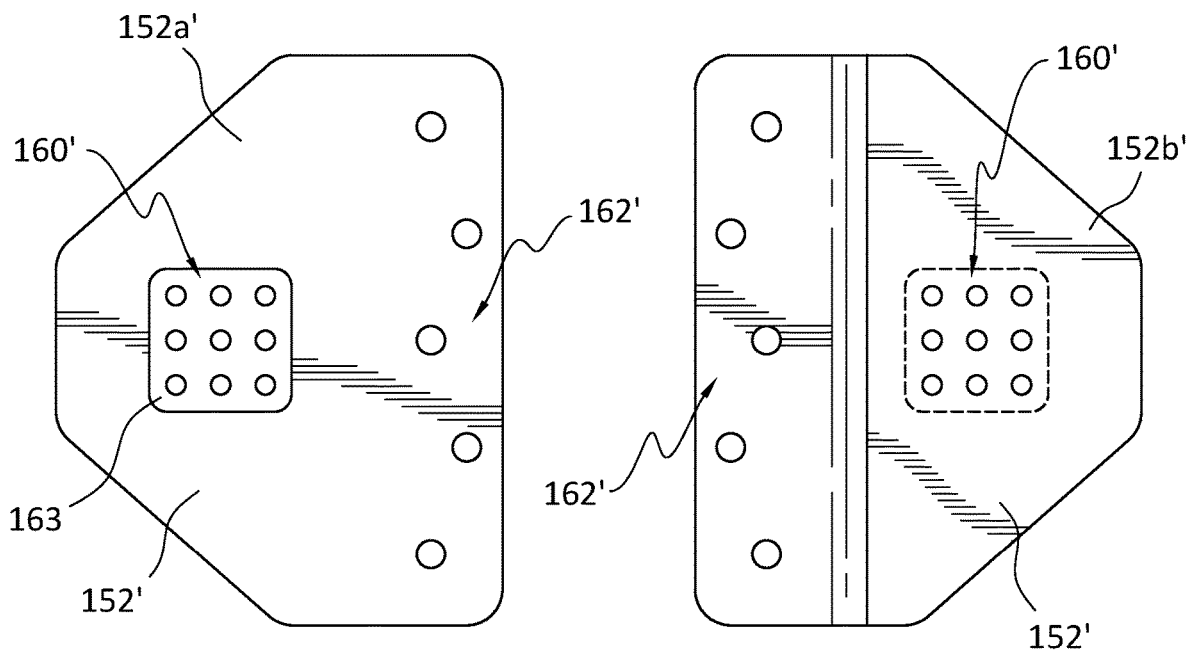
FIG. 36 is a front elevation view of the 4-point interface attachment coupling member shown in FIG. 35.
FIG. 37 is a rear elevation view of the 4-point interface attachment coupling member shown in FIG. 35.

For example, and with reference to FIG. 30, the enclosure 10 allows for the mounting of payloads in a fully enclosed manner, internally with a viewing port, or externally on the external surface of the respective sidewalls. In practice, the first end wall 26 is directly secured to the hull 202 of an ESPA ring 204 using the holes 26h formed along the first end wall 26. The holes 26h are designed to match a known pattern (for example, a 4-point mount configuration, a 15 inch diameter bolt hole pattern, or a 24 inch diameter bolt hole pattern, all of which are known to be commonly used with ESPA rings) used on the hull 202 of an ESPA ring 204. While specific standard mounting hole patterns are contemplated for use in accordance with the present invention, custom mounting arrangements may be employed as needed.

In accordance with an alternate embodiment as disclosed with reference to FIGS. 31 to 37, the first end wall 26' may be structured in a different manner, that is, with a picture frame configuration with integral flanges for attachment to the remainder of the enclosure 10.

The first end wall 26' is secured to the sidewalls 18, 20, 22, 24 via flange members 16' integrally formed with the first end wall 26'. The flange members 16' are shaped and dimensioned for engaging respective edges of the various walls to create the six-sided enclosure 10 in which articles may be stored and supported. The first end wall 26' is also provided with coupling holes 120' in the flange members 16' for attachment of the flange members 16' and the sidewalls 18, 20, 22, 24 as described above with regard to the prior embodiment.

This embodiment differs with regard to the shape of the opening 22', the provision of integral flanges members 16' for the attachment of sidewalls 18, 20, 22, 24, the inclusion of mounting hole sets 150a', 150b', 150c', 150d' formed along the outer facing surface of the first end wall 26' about the opening 22', and the use of interface attachment coupling members 152' in conjunction with the mounting hole sets 150a', 150b', 150c', 150d' for creating attachment points for securing the enclosure 10 to the ESPA ring 204 as discussed above.

First, the opening 22' is square and includes four edges 158' and four corners 156'. Stabilizing plates 154' are formed in the corners 156' of the opening 22'. The stabilizing plates 154' extend between adjacent edges 158'. While a square shape is disclosed, it appreciated the opening could be rectangular. Extending from the interior surface 26i' of the first end wall 26' about the perimeter of the opening 22' are flange members 16' integrally formed with the first end wall 26' that are used for attachment of the sidewalls 18, 20, 22, 24 to the first end wall 26'. In particular, the flange members 16' are provide with holes 120' for alignments with the holes 120' of the side walls 18, 20, 22, 24. In accordance with a preferred embodiment of the present invention, the flanges members 16' are cast aluminum integrally formed with the remainder of the first end wall 26'. As briefly mentioned above, the flanges member 16' extend perpendicularly from the interior surface 26i' of the first end wall 26'. Each of the flange members 16' includes an outer planar coupling surface to which the sidewalls 18, 20, 22, 24 are secured using fastening members and adhesive as with the prior embodiment.

As to the attachment of the first end wall 26' to spacecraft 200, in particular the ESPA ring 204 of the spacecraft 200, a 4-point mounting interface assembly 151' is provided for used in conjunction with a 4-point mount configuration in accordance with the disclosed embodiment. The interface assembly 151' includes four interface attachment coupling members 152', each including bolt hole patterns for attachment to the ESPA ring 204 and the enclosure 10. The custom interface attachment coupling members 152' are attached between the mounting hole sets 150a', 150b', 150c', 150d' formed along the perimeter of the first end wall 26' and the mounting holes (not shown) formed in the ESPA ring 204.

In particular, the interface attachment coupling members 152' are first secured to the ESPA ring 204 using the coupling holes 160' defining a 9-hole bolt pattern. The interface attachment coupling members 152' are secured to the ESPA ring 204 with the ESPA interface side 152a' of the interface attachment coupling members 152' facing the ESPA ring 204. Thereafter, the enclosure 10' is secured to the interface attachment coupling members 152' using the coupling holes 162' that align with the mounting hole sets 150a', 150b', 150c', 150d'. The interface attachment coupling members 152' are secured to the enclosure 10' with the enclosure interface side 152b' of the interface attachment coupling members 152' facing the enclosure 10'. In order to facilitate attachment, the enclosure interface side 152b' is provided with a recessed surface 163' around the 9-hole bolt pattern to accommodate bolt heads. Also, the ESPA interface side 152a' is provide with distinct non-planar parallel surfaces that also help facilitate attachment of the enclosure to the ESPA ring. As with the other coupling mechanisms described herein, fasteners and adhesive are used in conjunction with the holes to connect the interface attachment coupling members 152' to the first end wall 26' and to connect the interface attachment coupling members 152' (an ultimately, the enclosure 10) to the ESPA ring 204. It should be appreciated that while the interface attachment coupling members are disclosed as being generally triangular, they may be formed in a variety of shapes so long as the connection points, that is, the holes, align for proper assembly.

Figure 38:
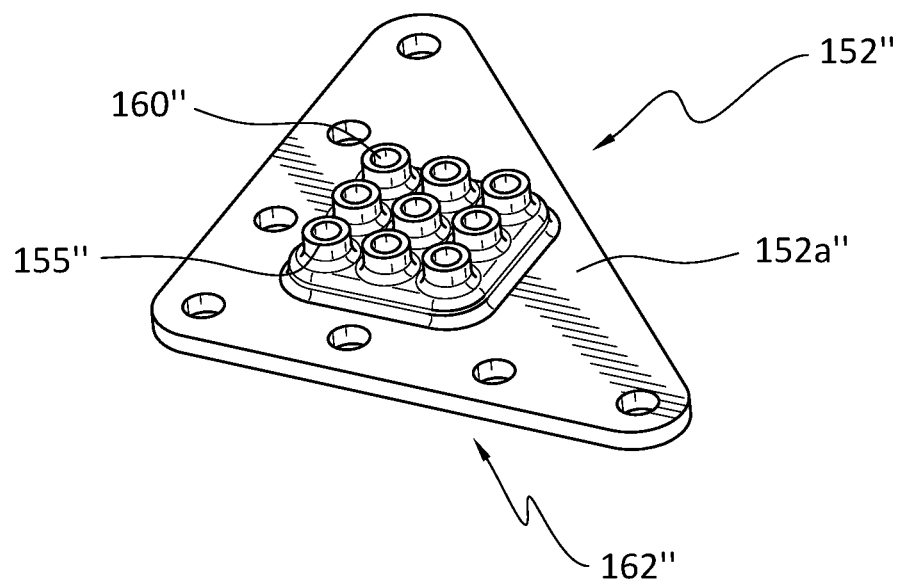
FIG. 38 is a perspective view of an alternate interface attachment coupling member.
Figure 39:
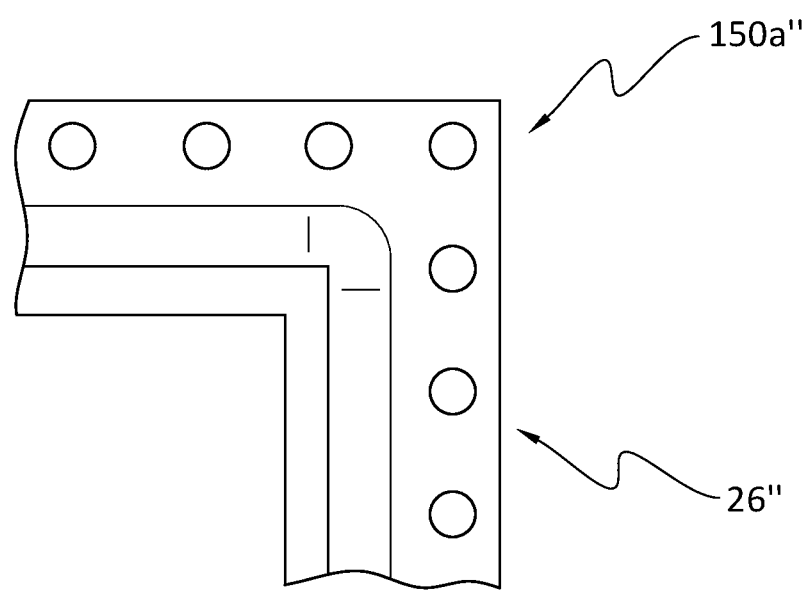
FIG. 39 is a detailed elevation view of the an alternate first end wall.

While an interface attachment coupling member is disclosed above for use in conjunction with a 4-point mounting configuration, it is appreciated other mounting configurations are known, for example, 6-point and 8-point mount configurations. The mounting configurations employ similar interface attachment coupling members which may be varied with regard to specific shapes (for example, the interface attachment coupling member be L-shaped to allow for positioning along a corner of the first end wall) and hole patterns to allow them to interface with the various mounting configurations. For example, and with reference to FIG. 38, an alternate interface attachment coupling member 152" is shown. This interface attachment coupling member 152" is adapted for positioning at the corner of the first end wall and includes coupling holes 162" in an L-shaped arrangement (for alignment with similarly formed holes 150a" 26" in the first end wall, which it is appreciated would be adapted to include necessary holes (see FIG. 39). On the ESPA interface side 152a", the interface attachment coupling member 152" includes protrusions 155" surrounding the coupling holes 160" to minimize the contact surface between the interface attachment coupling member 152" and the ESPA ring 204 to minimize thermal transfer.

As explained in conjunction with the prior embodiment, the enclosure also includes an internal support structure supporting the article as it sits within the enclosure. As with prior embodiment, the internal support structure is constructed to support a center mounting panel for electronic boxes offering various functionalities. A similar internal support structure may be used in conjunction with the alternate embodiment for the first end wall 26'.

The enclosure 10 alternate embodiment can connect to various spacecraft 200 configurations that in turn connect to the ESPA ring 204.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An enclosure for ensuring that a payload survives launch requirements and space environment, comprising:
   a plurality of interconnected walls, wherein a first end wall includes an opening and holes designed to match a known pattern on a hull of an ESPA ring;
   elongated edge connecting members;
   corner connecting members;
   flange members; and
   an internal support structure supporting the payload as it sits within the enclosure, wherein the internal support structure includes a center mounting panel extending between the first end wall and a second end wall;
   wherein the elongated edge connecting members, corner connecting members, and flange members connect adjacent interconnected walls to define an internal compartment shaped and dimensioned for receiving the payload to be transported upon a spacecraft.

2. The enclosure according to claim 1, further including an internal support structure supporting the payload as it sits within the enclosure.

3. The enclosure according to claim 2, wherein the internal support structure includes a center mounting panel.

4. The enclosure according to claim 2, wherein the internal support structure includes a first slot support assembly positioned adjacent the first end of the enclosure where a first end wall is secured and a second slot support assembly positioned adjacent the second end of the enclosure where a second end wall is secured.

5. The enclosure according to claim 4, wherein the first slot support assembly includes first, second, third, and fourth slot flange members secured along an interior surface of the first end wall on opposite sides of an opening.

6. The enclosure according to claim 1, wherein the plurality of interconnected walls includes four sidewalls, a first end wall, and a second end wall.

7. The enclosure according to claim 1, wherein, when viewed along an end, each of the edge connecting members exhibits a generally V-shaped construction and includes a core section from which first and second flange members extend.

8. The enclosure according to claim 7, wherein the core section is composed of first and second planar members connected at their respective first ends such that the first and second planar members are oriented perpendicular to each other, and the respective second ends of the first and second planar members are connected by an arcuate member, wherein the first planar member, the second planar member, and the arcuate member define a cavity that extends an entire length of the edge connecting member.

9. The enclosure according to claim 8, wherein exposed surfaces of the first and second planar members respectively define first and second end surfaces which function to support sidewalls, a first end wall, and a second end wall.

10. The enclosure according to claim 9, further including outwardly extending flange members that extend perpendicular to the first and second end surfaces to further define a surface structure used to support the sidewalls and the second end wall, wherein the first and second end surfaces are oriented at a 90 degree angle such that they may support walls at a desired perpendicular orientation.

11. The enclosure according to claim 1, wherein the corner connecting members includes a core section from which first, second, and third coupling members extend.

12. The enclosure according to claim 11, wherein the core section is composed of first, second, and third planar members connected at their respective first ends, with a common central meeting point for the corners of the first, second, and third planar members, such that the first, second and third planar members are oriented perpendicular to each other.

13. The enclosure according to claim 12, wherein the respective second ends of the first, second, and third planar members are connected by a spheroidal member and the first planar member, the second planar member, the third planar member, and the spheroidal member define a cavity that sits at each of the corners of the enclosure.

14. The enclosure according to claim 13, wherein outer surfaces of the first, second, and third planar members respectively define first, second, and third core surfaces from which edge coupling structures extend, wherein the edge coupling structures are shaped and dimensioned for male/female coupling with the edge connecting members.

15. The enclosure according to claim 1, wherein [Ethel] flange members are secured along an interior surface of a first end wall and are adapted for engagement with the ends of the edge connecting members and an interior surface of sidewalls.

16. The enclosure according to claim 15, wherein each flange member is an elongated L-shaped member having first and second planar coupling members oriented perpendicular.

17. The enclosure according to claim 16, wherein the first planar coupling member being shaped and dimensioned for coupling to the interior surface of the first end wall and the second planar coupling member is shaped and dimensioned for coupling to the ends of the edge connecting members and interior surfaces of the respective sidewalls.

18. The enclosure according to claim 1, further including a 4-point mounting interface assembly including a plurality of interface attachment coupling members, each of the plurality of interface attachment coupling members including bolt hole patterns for attachment to the ESPA ring and the enclosure.

19. An enclosure for ensuring that a payload survives launch requirements and space environment, comprising:
 a plurality of interconnected walls;
 elongated edge connecting members:
 corner connecting members;
 flange members; and
 an internal support structure supporting the payload as it sits within the enclosure, wherein the internal support structure includes a center mounting panel, wherein the center mounting panel includes electronic boxes;
 wherein the elongated edge connecting members, corner connecting members, and flange members connect adjacent interconnected walls to define an internal compartment shaped and dimensioned for receiving the payload to be transported upon a spacecraft.

20. An enclosure for ensuring that a payload survives launch requirements and space environment, comprising:
 a plurality of interconnected walls;
 elongated edge connecting members;
 corner connecting members;
 flange members; and
 a 4-point mounting interface assembly attached between the enclosure and a spacecraft;
 wherein the elongated edge connecting members corner connecting members, and flange members connect adjacent interconnected walls to define an internal compartment shaped and dimensioned for receiving the payload to be transported upon a spacecraft.

* * * * *